US011653238B2

(12) United States Patent
Qin et al.

(10) Patent No.: US 11,653,238 B2
(45) Date of Patent: May 16, 2023

(54) MEASUREMENT REPORTING METHOD AND DEVICE

(71) Applicant: HUAWEI TECHNOLOGIES CO., LTD., Guangdong (CN)

(72) Inventors: Yi Qin, Kista (SE); Yu Sun, Shanghai (CN); Zhongfeng Li, Shanghai (CN); Chi Zhang, Shanghai (CN); Ming Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 16/715,786

(22) Filed: Dec. 16, 2019

(65) Prior Publication Data
US 2020/0120531 A1   Apr. 16, 2020

Related U.S. Application Data

(63) Continuation of application No. PCT/CN2018/091052, filed on Jun. 13, 2018.

(30) Foreign Application Priority Data

Jun. 16, 2017   (CN) .......................... 201710459811.1

(51) Int. Cl.
H04W 24/10 (2009.01)
H04B 17/336 (2015.01)
(Continued)

(52) U.S. Cl.
CPC .......... H04W 24/10 (2013.01); H04B 17/336 (2015.01); H04L 5/0051 (2013.01); H04W 72/046 (2013.01); H04W 72/1263 (2013.01)

(58) Field of Classification Search
None
See application file for complete search history.

(56) References Cited

U.S. PATENT DOCUMENTS 10,531,365 B2 *   1/2020   Kaur ..................... H04W 48/10
2012/0213261 A1 *   8/2012   Sayana ................. H04L 5/0094
375/224

(Continued)

FOREIGN PATENT DOCUMENTS

CN   104081813 A   10/2014
CN   104205696 A   12/2014
(Continued)

OTHER PUBLICATIONS

3GPP TS 36.213 V14.2.0 (Mar. 2017), "3rd Generation Partnership Project; Technical Specification Group Radio Access Network; Evolved Universal Terrestrial Radio Access (E-UTRA); Physical layer procedures (Release 14)," Mar. 2017, 454 pages.

(Continued)

Primary Examiner — Adnan Baig
(74) Attorney, Agent, or Firm — Fish & Richardson P.C.

(57) ABSTRACT

Example methods and devices are disclosed. One example method includes receiving, by a first device, configuration information from a second device, where the configuration information is used by the first device to report information about an association relationship between a zero power-reference signal resource and a non-zero power-reference signal resource. The first device can then report the information about the association relationship based on the configuration information.

21 Claims, 6 Drawing Sheets

(51) Int. Cl.
*H04L 5/00* (2006.01)
*H04W 72/044* (2023.01)
*H04W 72/1263* (2023.01)

(56) References Cited

U.S. PATENT DOCUMENTS

| | | | |
|---|---|---|---|
| 2013/0301448 A1* | 11/2013 | Sayana | H04W 24/10 370/252 |
| 2013/0301450 A1 | 11/2013 | Geirhofer et al. | |
| 2015/0207600 A1* | 7/2015 | Park | H04B 7/024 370/329 |
| 2016/0330004 A1 | 11/2016 | Kim et al. | |
| 2016/0359538 A1 | 12/2016 | Onggosanusi et al. | |
| 2017/0006492 A1* | 1/2017 | Khoshnevisan | H04J 11/0053 |
| 2017/0012691 A1 | 1/2017 | Lee et al. | |
| 2018/0041906 A1* | 2/2018 | Jang | H04W 24/10 |
| 2018/0054797 A1* | 2/2018 | Islam | H04L 5/0035 |
| 2018/0248601 A1* | 8/2018 | Kishiyama | H04B 7/0417 |

FOREIGN PATENT DOCUMENTS

| | | |
|---|---|---|
| CN | 105229937 A | 1/2016 |
| CN | 105723641 A | 6/2016 |
| CN | 105978677 A | 9/2016 |
| CN | 106464401 A | 2/2017 |
| EP | 2662987 A2 | 11/2013 |
| EP | 2670187 A1 | 12/2013 |
| WO | 2017028006 A1 | 2/2017 |
| WO | 2017037505 A1 | 3/2017 |

OTHER PUBLICATIONS

Extended European Search Report and Written Opinion issued in European Application No. 18816844.7 dated Feb. 21, 2020, 9 pages.
LG Electronics, "Discussion on higher-layer signaling for NAICS," 3GPP TSG RAN WG1 Meeting #77, R1-142162, Seoul, Korea, May 19-23, 2014, 7 pages.
Office Action issued in Chinese Application No. 201710459811.1 dated Jan. 6, 2020, 15 pages (with English translation).
PCT International Search Report and Written Opinion issued in International Application No. PCT/CN2018/091052 dated Aug. 29, 2018, 13 pages (with English translation).
Zte et al.,"Discussion on Measurement and RS Design for CLI Mitigation," 3GPP TSG RAN WG1 AH_NR #1 Meeting, R1-1700271, Spokane, Washington, USA, Jan. 16-20, 2017, 8 pages.
EPO Communication pursuant to Article 94(3) EPC issued in European Application No. 18816844.7 dated Aug. 3, 2021, 6 pages.

* cited by examiner

MEASUREMENT REPORTING METHOD AND DEVICE

CROSS-REFERENCE TO RELATED APPLICATIONS

This application is a continuation of international Application No. PCT/CN2018/091052 filed on Jun. 13, 2018, which claims priority to Chinese Patent Application No. 201710459811.1, filed on Jun. 16, 2017. The disclosures of the aforementioned applications are hereby incorporated by reference in their entireties.

TECHNICAL FIELD

This application relates to the field of wireless communications technologies, and in particular, to a measurement reporting method and a device.

BACKGROUND

A beam management technology is introduced into a new radio technology. In downlink beam management, a client measures a reference signal that is sent by a base station end by using a downlink transmit beam, and groups transmit beams at the base station end based on a specific criterion. It may be considered that there is a relatively strong correlation or relatively strong interference between downlink transmit beams at the base station end that are received by a downlink receive beam (or a downlink receive beam group) or a downlink receive antenna group (or an antenna array/panel) of a same terminal device. Interference information of the terminal device end obtained by the base station is beneficial to resource scheduling, and is particularly beneficial to resource scheduling in a multi-user MIMO (English full name: multi-user multi-input-multi-output, English acronym: MU-MIMO) scenario. Currently, a beam grouping manner is mainly used. The base station allocates a non zero power-reference signal (English full name: non zero power-channel state information-reference signal, English acronym: NLP-CSI-RS) resource and a zero power-reference signal (English full name: zero power-channel state information-reference signal, English acronym: ZP-CSI-RS) resource to the terminal device. The terminal device measures, on different NZP-CSI-RS resources, reference signals on a plurality of downlink transmit beams of another base station, and groups the downlink transmit beams at the base station end into one or more beam groups based on a particular grouping principle. Then, the terminal device reports, by reporting a value of a reference signal resource channel state indicator (English full name: CSI-RS resource indicator, English acronym: CRI) corresponding to the beam group, beam grouping information to the base station to which the terminal device belongs, so that the base station performs MU scheduling on the terminal device based on the reported beam grouping information after receiving the beam grouping information.

In a multi-cell scenario, when a dynamic time division duplex (English acronym: TDD) technology is used, the terminal device may further receive an uplink transmit signal from user equipment of a neighboring cell while receiving a downlink signal from a base station of a local cell. If there is a relatively strong correlation between the uplink transmit signal and a beam used by the downlink signal that is received by the terminal device from the base station, a received signal of the terminal device is to be seriously interfered. In addition, to improve coverage of the base station, relay transmission is further introduced. A plurality of backhaul links and one access link may exist in a multi-hop relay system. A relay node may receive uplink signal interference from the terminal device while receiving a downlink signal from the base station. According to an existing beam grouping method, the user equipment can group downlink transmit beams of the base station based only on a reference signal sent by the base station based on an NZP-CSI-RS resource, and the base station can perform scheduling based only on beam grouping information reported by the user equipment. It can be learned that in such a beam grouping manner, only a correlation between downlink transmit beams of the base station end at the user equipment end can be reflected, and for interference between terminal devices in a backhaul link scenario between relay devices, and for a scenario of cross-interference between terminal devices, the base station cannot learn correlations respectively between the two types of interference and downlink transmit beams of the base station, that is, cannot learn interference statuses in the two types of scenarios. Consequently, it is difficult to avoid interference by using a base station scheduling method.

SUMMARY

This application provides a measurement reporting method and a device, to resolve a prior-art problem that a base station cannot learn a correlation between interference in a backhaul link scenario and a downlink transmit beam of the base station and a correlation between interference in a cross link scenario and a downlink transmit beam of the base station.

A first aspect of this application provides a measurement reporting method, where the method includes:

receiving, by a first device, configuration information from a second device, where the configuration information is used by the first device to report information about an association relationship between a zero power-reference signal resource and a non zero power-reference signal resource; and reporting, by the first device, the information about the association relationship based on the configuration information, where the information about the association relationship may be sent to the second device or another device.

Compared with an existing mechanism, in this application, after receiving the configuration information sent by the second device, the first device may report, based on a requirement of the configuration information, information that is measured on the zero power resource and that is about an association relationship between a downlink transmit beam and an interfering signal from another device, so that the second device can accurately learn the information about an association relationship between an interference beam interfering with the first device and the downlink transmit beam, instead of learning only information about an association relationship between downlink transmit beams of the second device and being incapable of performing targeted resource scheduling to avoid interference. It can be learned that the association relationship between the zero power-reference signal resource and the non zero power-reference signal resource is reported, so that the second device can perform targeted coordination based on the information about the association relationship when performing resource scheduling, and scheduling of beams with strong mutual interference in two cells is avoided, thereby reducing interference.

In some possible designs, the configuration information includes a reference signal association relationship type instruction, and the reference signal association relationship type instruction is used to instruct the first device to report the information about the association relationship between the zero power-reference signal resource and the non zero power-reference signal resource.

In some possible designs, the configuration information may further include at least one measurement threshold, and the at least one measurement threshold is used to determine the association relationship between the zero power-reference signal resource and the non zero power-reference signal resource.

Specifically, when the configuration information includes one measurement threshold, the measurement threshold is used to determine a measurement value of a reference signal mapped to the zero power-reference signal resource and a measurement value of a reference signal mapped to the non zero power-reference signal resource.

The configuration information includes two measurement thresholds: a first measurement threshold and a second measurement threshold. The first measurement threshold is used to determine a measurement value of a reference signal mapped to the zero power-reference signal resource; and the second measurement threshold is used to determine a measurement value of a non-zero reference signal mapped to the non zero power-reference signal resource.

Optionally, the association relationship includes one of the following:

(1) Both a zero power-reference signal measurement value and a non zero power-reference signal measurement value are greater than a first measurement threshold;

(2) a zero power-reference signal measurement value is greater than a first measurement threshold, and a non zero power-reference signal measurement value is greater than a second measurement threshold;

(3) both a zero power-reference signal measurement value and a non zero power-reference signal measurement value are less than a first measurement threshold;

(4) a zero power-reference signal measurement value is less than a first measurement threshold, and a non zero power-reference signal measurement value is less than a second measurement threshold;

(5) there is a spatial quasi co-location QCL relationship between the zero power-reference signal resource and the non zero power-reference signal resource;

(6) both a zero power-reference signal and a non zero power-reference signal may be received by the first device; or (7) a zero power-reference signal and a non zero power-reference signal may be received by the first device by using a same antenna array or a same antenna panel.

The non zero power-reference signal is a signal mapped to the non zero power-reference signal resource, and the zero power-reference signal is a signal mapped to the zero power-reference signal resource. The zero power-reference signal and the non zero power-reference signal may be used to measure channel state information. The reference signal may be a channel state information-reference signal CSI-RS, a demodulation reference signal DMRS, a synchronization signal, or a reference signal in a synchronization signal block.

Values of the first measurement threshold and the second measurement threshold are not limited in this application. The first measurement threshold and/or the second measurement threshold may be configured by the second device by using the configuration information, or may be predefined based on a protocol.

In some possible designs, it may be determined, based on a QCL parameter, whether there is a spatial QCL relationship between the zero power-reference signal resource and the non zero power-reference signal resource. The QCL parameter may be at least one of the following: delay spread, Doppler spread, Doppler frequency shift, an average delay, an average gain, an angle of arrival AOA, an average AOA, AOA spread, an angle of departure, an average angle of departure AOD, AOD spread, a receive antenna spatial correlation parameter, a transmit antenna spatial correlation parameter, a transmit beam, a receive beam, or a resource index.

For example, when the angle of arrival AOA is used to determine whether there is a spatial QCL relationship between the zero power-reference signal resource and the non zero power-reference signal resource, determining may be first performed based on a definition of the foregoing measurement threshold. Specifically, a value relationship between the angle of arrival AOA and the measurement threshold may be determined based on (1), (2), (3), or (4) in the association relationship. To be specific, an angle threshold may be set for the angle of arrival AOA, and if an angle of arrival AOA that is currently obtained through measurement is greater than the specified angle threshold, it indicates that there is an association relationship between reference signal resources whose angles of arrival AOAs are greater than the angle threshold. When another QCL parameter is used to determine an association relationship, refer to the description of determining an association relationship by using the angle of arrival AOA. Details are not described again subsequently.

In some possible designs, the information about the association relationship may be reported in the following two manners:

1. Reference signal resource group information is used.

To be specific, the information about the association relationship includes reference signal resource group information of at least one reference signal resource group, and each reference signal resource group includes at least one zero power-reference signal resource.

Each piece of reference signal resource group information may include at least one reference signal resource index, the at least two reference signal resource indexes may correspond to at least one reference signal resource group, and one reference signal resource index corresponds to one reference signal resource.

Optionally, the reference signal resource group information includes a group number of the reference signal resource group.

Optionally, the reference signal resource group includes at least one zero power-reference signal resource and at least one non zero power-reference signal resource, and there is an association relationship between a zero power-reference signal resource and a non zero power-reference signal resource that belong to a same reference signal resource group.

Optionally, the reference signal resource group includes at least one zero power-reference signal resource and at least one non zero power-reference signal resource, and there is no association relationship between a zero power-reference signal resource and a non zero power-reference signal resource that belong to a same reference signal resource group.

Optionally, the reference signal resource group includes at least one zero power-reference signal resource and the reference signal group does not include any non zero power-reference signal resource, there is an association relationship between zero power-reference signal resources that belong to a same reference signal resource group, and the reference signal resource group corresponds to at least one non zero power-reference signal resource. The reference signal resource includes at least one of a time domain resource, a frequency domain resource, a code domain a resource, and an antenna port.

Specifically, for a reference signal resource in the reference signal resource group, one of the following conditions may be included:

The non zero power-reference signal resource and the zero power-reference signal resource that have the association relationship belong to a same reference signal resource group. For example, a reference signal resource group includes a ZP-CSI-RS resource and an NZP-CSI-RS resource, and these CSI-RS resources have an association relationship with each other.

The non zero power-reference signal resource and the zero power-reference signal resource that have the association relationship belong to different reference signal resource groups. For example, a reference signal resource group includes a ZP-CSI-RS resource and an NZP-CSI-RS resource, and these CSI-RS resources have no association relationship with each other.

The reference signal resource group includes only zero power-reference signal resources, these zero power-reference signal resources have an association relationship between each other, and these zero power-reference signal resources correspond to at least one non zero power-reference signal resource.

The reference signal resource group includes only zero power-reference signal resources, these zero power-reference signal resources have no association relationship between each other, and these zero power-reference signal resources correspond to at least one non zero power-reference signal resource.

The reference signal resource group includes only non zero power-reference signal resources, and these non zero power-reference signal resources have an association relationship between each other.

Alternatively, the reference signal resource group includes only non zero power-reference signal resources, and these non zero power-reference signal resources have no association relationship between each other.

It can be learned that resources that have an association relationship fall within a same reference signal resource group, resources that have an association relationship fall within different reference signal resource groups, or resources that have no association relationship fall within a same reference signal resource group.

Optionally, in some possible designs, the reference signal resource group information may include an index of a reference signal resource that belongs to the reference signal resource group. Each piece of reference signal resource group information may include one of the following:

a resource index of at least one zero power-reference signal resource that has an association relationship with a non zero power-reference signal resource; or a resource index of at least one non zero power-reference signal resource; or a resource index of at least one zero power-reference signal resource that has no association relationship with a non zero power-reference signal resource.

2. A mapping relationship between information about reference signals is used.

The reference signal is a zero power-reference signal or a non zero power-reference signal. The information about the association relationship includes at least one of the following:

a mapping relationship between information about at least one zero power-reference signal and information about at least one non zero power-reference signal; or information about at least one non zero power-reference signal; or information about at least one reference signal, and information about another reference signal that has an association relationship with the reference signal; or information about at least one reference signal, and information about another reference signal that has no association relationship with the at least one reference signal.

The mapping relationship is repotted, so that the second device can coordinate resources of the first device, thereby avoiding interference caused because beams in a same beam group are scheduled in two cells.

In some possible designs, the information about the association relationship further includes an association relationship between the zero power-reference signal resource in the reference signal resource group and a beam group, the beam group corresponds to the reference signal resource group, or the beam group is a beam set with or without a correlation, and a beam corresponds to a received reference signal.

The beam set with a correlation is a set of beams corresponding to a resource whose measurement value is greater than the measurement threshold; and the beam set without a correlation is a set of beams corresponding to a resource whose measurement value is less than the measurement threshold. It can be learned that the first device needs to report only a relationship between a beam group and an interfering resource causing interference to a local cell.

In some possible designs, the second device may further set at least one of a first upper limit and a second upper limit in the configuration information. The first upper limit refers to a maximum quantity of zero power-reference signal resources included in one reference signal resource group.

The second upper limit refers to a maximum quantity of non zero power-reference signal resources included in one reference signal resource group. An amount of information reported at a time may be limited by configuring an upper limit value of a resource quantity, thereby reducing resource overheads.

In some possible designs, the configuration information further includes a lower limit, the lower limit is a constraint condition for reporting the information about the association relationship, and the lower limit refers to a minimum quantity of zero power-reference signal resources associated with a beam group. When a quantity of the zero power-reference signal resources is less than the lower limit, it may be considered that there is a relatively small quantity of interfering beams from another device, in other words, interference obtained through measurement this time falls within a range acceptable to the first device. In this case, the interference obtained through measurement this time may be ignored, and therefore, there is no need to report zero power-reference signal resources obtained through measurement this time, thereby reducing overheads. In other words, the first device reports the association relationship only when a quantity of zero power-reference signal resources associated with a beam group is greater than the lower limit.

In some possible designs, a measurement value of a signal mapped to each reference signal resource may be further reported in the reported association relationship information, or a measurement value of a zero power-reference signal resource and a measurement value of a non zero power-reference signal resource may be further provided.

A second aspect of this application provides a measurement reporting method, where the method includes:

generating, by a second device, configuration information, and sending the configuration information to the first device, where the configuration information is used by the first device to report information about an association relationship between a zero power-reference signal resource and a non zero power-reference signal resource; and receiving, by the second device, the information about the association relationship reported by the first device based on the configuration information.

The second device configures information for the first device, so that the first device may report, based on a requirement of the configuration information, the information about the association relationship reflecting an interference status. In this way, the second device can accurately learn resources on which the first device is interfered with, instead of learning only a comprehensive interference status of the first device and being incapable of performing targeted resource scheduling. It can be learned that the association relationship between the zero power-reference signal resource and the non zero power-reference signal resource is reported, so that the second device can perform targeted coordination based on the information about the association relationship when performing resource scheduling, and scheduling of beams with strong mutual interference in two cells is avoided, thereby reducing interference.

In some possible designs, the configuration information includes a reference signal association relationship type instruction, and the reference signal association relationship type instruction is used to instruct the first device to report the information about the association relationship between the zero power-reference signal resource and the non zero power-reference signal resource.

In some possible designs, the configuration information includes at least one measurement threshold, the at least one measurement threshold is used to determine the association relationship between the zero power-reference signal resource and the non zero power-reference signal resource, and measurement thresholds may be separately set for the zero power-reference signal resource and the non zero power-reference signal resource, or only one measurement threshold may be set. This is not specifically limited in this application.

Optionally, the configuration information includes at least one of the following:

a measurement value of a signal mapped to reference signal resources that have an association relationship is greater than a measurement threshold;

a measurement value of a signal mapped to reference signal resources that have no association relationship is less than the measurement threshold;

there is a spatial quasi co-location QCL relationship between the zero power-reference signal resource and the non zero power-reference signal resource;

both a zero power-reference signal and a non zero power-reference signal may be received by the first device; or a zero power-reference signal and a non zero power-reference signal may be received by the first device by using a same antenna array or a same antenna panel.

The reference signal resource is the zero power-reference signal resource or the non zero power-reference signal resource, the non zero power-reference signal corresponds the non zero power-reference signal resource, and the zero power-reference signal corresponds the zero power-reference signal resource.

Correspondingly, the association relationship reported by the first device may include one of the following:

(1) Both a zero power-reference signal measurement value and a non zero power-reference signal measurement value are greater than a first measurement threshold;

(2) a zero power-reference signal measurement value is greater than a first measurement threshold, and a non zero power-reference signal measurement value is greater than a second measurement threshold;

(3) both a zero power-reference signal measurement value and a non zero power-reference signal measurement value are less than a first measurement threshold;

(4) a zero power-reference signal measurement value is less than a first measurement threshold, and a non zero power-reference signal measurement value is less than a second measurement threshold;

(5) there is a spatial quasi co-location QCL relationship between the zero power-reference signal resource and the non zero power-reference signal resource;

(6) both a zero power-reference signal and a non zero power-reference signal may be received by the first device; or (7) a zero power-reference signal and a non zero power-reference signal may be received by the first device by using a same antenna array or a same antenna panel.

The zero power-reference signal is a signal mapped to the zero power-reference signal resource, and the non zero power-reference signal is a signal mapped to the non zero power-reference signal resource. The zero power-reference signal and the non zero power-reference signal may be used to measure channel state information. The reference signal may be a channel state information-reference signal CSI-RS, a modulation reference signal DMRS, a synchronization signal, or a reference signal in a synchronization signal block.

The first measurement threshold and/or the second measurement threshold may be configured by the second device by using the configuration information, or may be pre-defined based on a protocol.

In some possible designs, it may be determined, based on a QCL parameter, whether there is a spatial QCL relationship between the zero power-reference signal resource and the non zero power-reference signal resource. The QCL parameter may be at least one of the following: delay spread, Doppler spread, Doppler frequency shift, an average delay, an average gain, an angle of arrival AOA, an average AOA, AOA spread, an angle of departure, an average angle of departure AOD, ADD spread, a receive antenna spatial correlation parameter, a transmit antenna spatial correlation parameter, a transmit beam, a receive beam, or a resource index.

For example, when the angle of arrival AOA is used to determine whether there is a spatial QCL relationship between the zero power-reference signal resource and the non zero power-reference signal resource, determining may be first performed based on a definition of the foregoing measurement threshold. Specifically, a value relationship between the angle of arrival AOA and the measurement threshold may be determined based on (1), (2), (3), or (4) in the association relationship in the second aspect. To be specific, an angle threshold may be set for the angle of arrival AOA, and if an angle of arrival AOA that is currently obtained through measurement is greater than the specified angle threshold, it indicates that there is an association relationship between reference signal resources whose angles of arrival AOAs are greater than the angle threshold. When another QCL parameter is used to determine an association relationship, refer to the description of determining an association relationship by using the angle of arrival AOA. Details are not described again subsequently.

In some possible designs, the information about the association relationship includes reference signal resource group information, and each reference signal resource group includes at least one zero power-reference signal resource. Each piece of reference signal resource group information includes at least two reference signal resource indexes, and one reference signal resource index corresponds to one reference signal resource. There is an association relationship between reference signal resources in the reference signal resource group, or there is no association relationship between reference signal resources in the reference signal resource group.

Optionally, the reference signal resource group information includes a group number of the reference signal resource group.

Optionally, the reference signal resource group includes at least one zero power-reference signal resource and at least one non zero power-reference signal resource, and there is an association relationship between a zero power-reference signal resource and a non zero power-reference signal resource that belong to a same reference signal resource group.

Optionally, the reference signal resource group includes at least one zero power-reference signal resource and at least one non zero power-reference signal resource, and there is no association relationship between a zero power-reference signal resource and a non zero power-reference signal resource that belong to a same reference signal resource group.

Optionally, the reference signal resource group includes at least one zero power-reference signal resource and the reference signal group does not include any non zero power-reference signal resource, there is an association relationship between zero power-reference signal resources that belong to a same reference signal resource group, and the reference signal resource group corresponds to at least one non zero power-reference signal resource. The reference signal resource includes at least one of a time domain resource, a frequency domain resource, a code domain a resource, and an antenna port.

Specifically, for a reference signal resource in the reference signal resource group, one of the following conditions may be included:

The non zero power-reference signal resource and the zero power-reference signal resource that have the association relationship belong to a same reference signal resource group. For example, a reference signal resource group includes a ZP-CSI-RS resource and an NZP-CSI-RS resource, and these CSI-RS resources have an association relationship with each other.

The non zero power-reference signal resource and the zero power-reference signal resource that have the association relationship belong to different reference signal resource groups. For example, a reference signal resource group includes a ZP-CSI-RS resource and an NZP-CSI-RS resource, and these CSI-RS resources have no association relationship with each other.

The reference signal resource group includes only zero power-reference signal resources, these zero power-reference signal resources have an association relationship between each other, and these zero power-reference signal resources correspond to at least one non zero power-reference signal resource.

The reference signal resource group includes only zero power-reference signal resources, these zero power-reference signal resources have no association relationship between each other, and these zero power-reference signal resources correspond to at least one non zero power-reference signal resource.

The reference signal resource group includes only non zero power-reference signal resources, and these non zero power-reference signal resources have an association relationship between each other.

Alternatively, the reference signal resource group includes only non zero power-reference signal resources, and these non zero power-reference signal resources have no association relationship between each other.

It can be learned that resources that have an association relationship fall within a same reference signal resource group, resources that have an association relationship fall within different reference signal resource groups, or resources that have no association relationship fall within a same reference signal resource group.

In some possible designs, the reference signal resource group information may include an index of a reference signal resource that belongs to the reference signal resource group.

In some possible designs, each piece of reference signal resource group information may include one of the following:

a resource index of at least one zero power-reference signal resource, where a zero power-reference signal resource corresponding to the resource index of the zero power-reference signal resource that is included in the at least one resource index corresponds to at least one non zero power-reference signal resource; or a resource index of at least one non zero power-reference signal resource; or a resource index of at least one zero power-reference signal resource that has no association relationship with a non zero power-reference signal resource.

In some possible designs, the reference signal resource group information includes at least one of the following:

a mapping relationship between information about at least one zero power-reference signal and information about at least one non zero power-reference signal; or information about at least one non zero power-reference signal; or information about at least one reference signal, and information about another reference signal that has an association relationship with the reference signal; or information about at least one reference signal, and information about another reference signal that has no association relationship with the at least one reference signal.

The reference signal is a zero power-reference signal or a non zero power-reference signal.

Optionally, the second device may further set at least one of a first upper limit and a second upper limit in the configuration information. The first upper limit refers to a maximum quantity of zero power-reference signal resources included in one reference signal resource group.

The second upper limit refers to a maximum quantity of non zero power-reference signal resources included in one reference signal resource group. An amount of information reported at a time may be limited by configuring an upper limit value of a resource quantity, thereby reducing resource overheads.

Optionally, the second device may further set a lower limit in the configuration information, the lower limit is a constraint condition for reporting the information about the association relationship, and the lower limit refers to a minimum quantity of zero power-reference signal resources associated with a beam group. When a quantity of the zero power-reference signal resources is less than the lower limit, it may be considered that there is a relatively small quantity of interfering beams from another device, in other words, interference obtained through measurement this time falls within a range acceptable to the first device. In this case, the interference obtained through measurement this time may be ignored, and therefore, there is no need to report zero power-reference signal resources obtained through measurement this time, thereby reducing overheads. In other words, the first device reports the association relationship only when a quantity of zero power-reference signal resources associated with a beam group is greater than the lower limit.

A third aspect of this application provides a communications device that has a function of implementing the measurement reporting method provided in the first aspect. The function may be implemented by hardware, or may be implemented by hardware executing corresponding software. The hardware or software includes one or more modules corresponding to the function. The module may be software and/or hardware.

In a possible design, the communications device may include a transceiver module and a processing module. The processing module is configured to control sending and receiving operations of the transceiver module.

The transceiver module is configured to: receive configuration information from a second device, where the configuration information is used by the first device to report information about an association relationship between a zero power-reference signal resource and a non zero power-reference signal resource; and report the information about the association relationship based on the received configuration information.

Optionally, the configuration information includes a reference signal association relationship type instruction, and the reference signal association relationship type instruction is used to instruct the first device to report the information about the association relationship between the zero power-reference signal resource and the non zero power-reference signal resource.

Optionally, the configuration information includes at least one measurement threshold, and the at least one measurement threshold is used to determine the association relationship between the zero power-reference signal resource and the non zero power-reference signal resource.

When the configuration information includes one measurement threshold, the measurement threshold is used to determine a measurement value of a reference signal mapped to the zero power-reference signal resource and a measurement value of a reference signal mapped to the non zero power-reference signal resource.

The configuration information includes two measurement thresholds: a first measurement threshold and a second measurement threshold. The first measurement threshold is used to determine a measurement value of a reference signal mapped to the zero power-reference signal resource; and the second measurement threshold is used to determine a measurement value of a non-zero reference signal mapped to the non zero power-reference signal resource. The first measurement threshold and/or the second measurement threshold may be configured by the second device by using the configuration information, or may be predefined based on a protocol.

Optionally, the association relationship includes one of the following:

(1) Both a zero power-reference signal measurement value and a non zero power-reference signal measurement value are greater than a first measurement threshold;

(2) a zero power-reference signal measurement value is greater than a first measurement threshold, and a non zero power-reference signal measurement value is greater than a second measurement threshold;

(3) both a zero power-reference signal measurement value and a non zero power-reference signal measurement value are less than a first measurement threshold;

(4) a zero power-reference signal measurement value is less than a first measurement threshold, and a non zero power-reference signal measurement value is less than a second measurement threshold;

(5) there is a spatial quasi co-location QCL relationship between the zero power-reference signal resource and the non zero power-reference signal resource;

(6) both a zero power-reference signal and a non zero power-reference signal may be received by the first device; or (7) a zero power-reference signal and a non zero power-reference signal may be received by the first device by using a same antenna array or a same antenna panel.

The zero power-reference signal is a signal mapped to the zero power-reference signal resource, and the non zero power-reference signal is a signal mapped to the non zero power-reference signal resource.

The first measurement threshold and/or the second measurement threshold may be configured by the second device by using the configuration information, or may be predefined based on a protocol.

In some possible designs, it may be determined, based on a QCL parameter, whether there is a spatial QCL relationship between the zero power-reference signal resource and the non zero power-reference signal resource. The QCL parameter may be at least one of the following: delay spread, Doppler spread, Doppler frequency shift, an average delay, an average gain, an angle of arrival AOA, an average AOA, AOA spread, an angle of departure, an average angle of departure AOD, AOD spread, a receive antenna spatial correlation parameter, a transmit antenna spatial correlation parameter, a transmit beam, a receive beam, or a resource index.

For example, when the angle of arrival AOA is used to determine whether there is a spatial QCL relationship between the zero power-reference signal resource and the non zero power-reference signal resource, determining may be first performed based on a definition of the foregoing measurement threshold. Specifically, a value relationship between the angle of arrival AOA and the measurement threshold may be determined based on (1), (2), (3), or (4) in the association relationship. To be specific, an angle threshold may be set for the angle of arrival AOA, and if an angle of arrival AOA that is currently obtained through measurement is greater than the specified angle threshold, it indicates that there is an association relationship between reference signal resources whose angles of arrival AOAs are greater than the angle threshold. When another QCL parameter is used to determine an association relationship, refer to the description of determining an association relationship by using the angle of arrival AOA. Details are not described again subsequently.

Optionally, the information about the association relationship includes reference signal resource group information of at least one reference signal resource group, and each reference signal resource group includes at least one zero power-reference signal resource.

Each piece of reference signal resource group information may include at least one reference signal resource index, the at least two reference signal resource indexes may correspond to at least one reference signal resource group, and one reference signal resource index corresponds to one reference signal resource.

Optionally, the reference signal resource group information includes a group number of the reference signal resource group.

Optionally, the reference signal resource group includes at least one zero power-reference signal resource and at least one non zero power-reference signal resource, and there is an association relationship between a zero power-reference signal resource and a non zero power-reference signal resource that belong to a same reference signal resource group.

Optionally, the reference signal resource group includes at least one zero power-reference signal resource and at least one non zero power-reference signal resource, and there is no association relationship between a zero power-reference signal resource and a non zero power-reference signal resource that belong to a same reference signal resource group.

Optionally, the reference signal resource group includes at least one zero power-reference signal resource and the reference signal group does not include any non zero power-reference signal resource, there is an association relationship between zero power-reference signal resources that belong to a same reference signal resource group, and the reference signal resource group corresponds to at least one non zero power-reference signal resource. The reference signal resource includes at least one of a time domain resource, a frequency domain resource, a code domain a resource, and an antenna port.

Specifically, for a reference signal resource in the reference signal resource group, one of the following conditions may be included:

The non zero power-reference signal resource and the zero power-reference signal resource that have the association relationship belong to a same reference signal resource group. For example, a reference signal resource group includes a ZP-CSI-RS resource and an NZP-CSI-RS resource, and these CSI-RS resources have an association relationship with each other.

The non zero power-reference signal resource and the zero power-reference signal resource that have the association relationship belong to different reference signal resource groups. For example, a reference signal resource group includes a ZP-CSI-RS resource and an NZP-CSI-RS resource, and these CSI-RS resources have no association relationship with each other.

The reference signal resource group includes only zero power-reference signal resources, these zero power-reference signal resources have an association relationship between each other, and these zero power-reference signal resources correspond to at least one non zero power-reference signal resource.

The reference signal resource group includes only zero power-reference signal resources, these zero power-reference signal resources have no association relationship between each other, and these zero power-reference signal resources correspond to at least one non zero power-reference signal resource.

The reference signal resource group includes only non zero power-reference signal resources, and these non zero power-reference signal resources have an association relationship between each other.

Alternatively, the reference signal resource group includes only non zero power-reference signal resources, and these non zero power-reference signal resources have no association relationship between each other.

Optionally, the reference signal resource group information includes an index of a reference signal resource that belongs to the reference signal resource group.

In some possible designs, each piece of reference signal resource group information may include one of the following:

a resource index of at least one zero power-reference signal resource, where a zero power-reference signal resource corresponding to the resource index of the zero power-reference signal resource that is included in the at least one resource index corresponds to at least one non zero power-reference signal resource; or a resource index of at least one non zero power-reference signal resource; or a resource index of at least one zero power-reference signal resource that has no association relationship with a non zero power-reference signal resource.

In some possible designs, the reference signal resource group information includes at least one of the following:

a mapping relationship between information about at least one zero power-reference signal and information about at least one non zero power-reference signal; or information about at least one non zero power-reference signal; or information about at least one reference signal, and information about another reference signal that has an association relationship with the reference signal; or information about at least one reference signal, and information about another reference signal that has no association relationship with the at least one reference signal.

The reference signal is a zero power-reference signal or a non zero power-reference signal.

Optionally, the second device may further set at least one of a first upper limit and a second upper limit in the configuration information. The first upper limit refers to a maximum quantity of zero power-reference signal resources included in one reference signal resource group.

The second upper limit refers to a maximum quantity of non zero power-reference signal resources included in one reference signal resource group. An amount of information reported at a time may be limited by configuring an upper limit value of a resource quantity, thereby reducing resource overheads.

Optionally, the second device may further set a lower limit in the configuration information, the lower limit is a constraint condition for reporting the information about the association relationship, and the lower limit refers to a minimum quantity of zero power-reference signal resources associated with a beam group.

A fourth aspect of this application provides a communications device that has a function of implementing the measurement reporting method provided in the second aspect. The function may be implemented by hardware, or may be implemented by hardware executing corresponding software. The hardware or software includes one or more modules corresponding to the function. The module may be software and/or hardware.

In a possible design, the communications device may include:

a processing module, configured to generate configuration information; and a transceiver module, configured to send the configuration information generated by the processing module to a first device, where the configuration information is used by the first device to report information about an association relationship between a zero power-reference signal resource and a non zero power-reference signal resource; and the transceiver module is further configured to receive the information about the association relationship reported by the first device based on the configuration information.

Optionally, the configuration information includes a reference signal association relationship type instruction, and the reference signal association relationship type instruction is used to instruct the first device to report the information about the association relationship between the zero power-reference signal resource and the non zero power-reference signal resource.

Optionally, the configuration information includes at least one measurement threshold, and the at least one measurement threshold is used to determine the association relationship between the zero power-reference signal resource and the non zero power-reference signal resource.

Optionally, the configuration information includes at least one of the following:

a measurement value of a signal mapped to reference signal resources that have an association relationship is greater than a measurement threshold;

a measurement value of a signal mapped to reference signal resources that have no association relationship is less than the measurement threshold;

there is a spatial quasi co-location QCL relationship between the zero power-reference signal resource and the non zero power-reference signal resource;

both a zero power-reference signal and a non zero power-reference signal may be received by the first device; or a zero power-reference signal and a non zero power-reference signal may be received by the first device by using a same antenna array or a same antenna panel.

The reference signal resource is the zero power-reference signal resource or the non zero power-reference signal resource, the non zero power-reference signal corresponds the non zero power-reference signal resource, and the zero power-reference signal corresponds the zero power-reference signal resource.

Optionally, the association relationship includes one of the following:

both a zero power-reference signal measurement value and a non zero power-reference signal measurement value are greater than a first measurement threshold;

a zero power-reference signal measurement value is greater than a first measurement threshold, and a non zero power-reference signal measurement value is greater than a second measurement threshold;

both a zero power-reference signal measurement value and a non zero power-reference signal measurement value are less than a first measurement threshold;

a zero power-reference signal measurement value is less than a first measurement threshold, and a non zero power-reference signal measurement value is less than a second measurement threshold;

there is a spatial quasi co-location QCL relationship between the zero power-reference signal resource and the non zero power-reference signal resource;

both a zero power-reference signal and a non zero power-reference signal may be received by the first device; or a zero power-reference signal and a non zero power-reference signal may be received by the first device by using a same antenna array or a same antenna panel.

The zero power-reference signal is a signal mapped to the zero power-reference signal resource, and the non zero power-reference signal is a signal mapped to the non zero power-reference signal resource.

Optionally, the information about the association relationship includes reference signal resource group information of the reference signal resource, and each reference signal resource group includes at least one zero power-reference signal resource.

Each piece of reference signal resource group information may include at least one reference signal resource index, the at least two reference signal resource indexes may correspond to at least one reference signal resource group, and one reference signal resource index corresponds to one reference signal resource.

Optionally, the reference signal resource group information includes a group number of the reference signal resource group.

Optionally, the reference signal resource group includes at least one zero power-reference signal resource and at least one non zero power-reference signal resource, and there is an association relationship between a zero power-reference signal resource and a non zero power-reference signal resource that belong to a same reference signal resource group.

Optionally, the reference signal resource group includes at least one zero power-reference signal resource and at least one non zero power-reference signal resource, and there is no association relationship between a zero power-reference signal resource and a non zero power-reference signal resource that belong to a same reference signal resource group.

Optionally, the reference signal resource group includes at least one zero power-reference signal resource and the reference signal group does not include any non zero power-reference signal resource, there is an association relationship between zero power-reference signal resources that belong to a same reference signal resource group, and the reference signal resource group corresponds to at least one non zero power-reference signal resource. The reference signal resource includes at least one of a time domain resource, a frequency domain resource, a code domain a resource, and an antenna port.

Specifically, for a reference signal resource in the reference signal resource group, one of the following conditions may be included:

The non zero power-reference signal resource and the zero power-reference signal resource that have the association relationship belong to a same reference signal resource group. For example, a reference signal resource group includes a ZP-CSI-RS resource and an NZP-CSI-RS resource, and these CSI-RS resources have an association relationship with each other.

The non zero power-reference signal resource and the zero power-reference signal resource that have the association relationship belong to different reference signal resource groups. For example, a reference signal resource group includes a ZP-CSI-RS resource and an NZP-CSI-RS resource, and these CSI-RS resources have no association relationship with each other.

The reference signal resource group includes only zero power-reference signal resources, these zero power-reference signal resources have an association relationship between each other, and these zero power-reference signal resources correspond to at least one non zero power-reference signal resource.

The reference signal resource group includes only zero power-reference signal resources, these zero power-reference signal resources have no association relationship between each other, and these zero power-reference signal resources correspond to at least one non zero power-reference signal resource.

The reference signal resource group includes only non zero power-reference signal resources, and these non zero power-reference signal resources have an association relationship between each other.

Alternatively, the reference signal resource group includes only non zero power-reference signal resources, and these non zero power-reference signal resources have no association relationship between each other.

Optionally, the reference signal resource group information includes an index of a reference signal resource that belongs to the reference signal resource group.

In some possible designs, each piece of reference signal resource group information may include one of the following:

a resource index of at least one zero power-reference signal resource, where a zero power-reference signal resource corresponding to the resource index of the zero power-reference signal resource that is included in the at least one resource index corresponds to at least one non zero power-reference signal resource; or a resource index of at least one non zero power-reference signal resource; or a resource index of at least one zero power-reference signal resource that has no association relationship with a non zero power-reference signal resource.

In some possible designs, the reference signal resource group information includes at least one of the following:

a mapping relationship between information about at least one zero power-reference signal and information about at least one non zero power-reference signal; or information about at least one non zero power-reference signal; or information about at least one reference signal, and information about another reference signal that has an association relationship with the reference signal; or information about at least one reference signal, and information about another reference signal that has no association relationship with the at least one reference signal.

The reference signal is a zero power-reference signal or a non zero power-reference signal.

Optionally, the second device may further set at least one of a first upper limit and a second upper limit in the configuration information. The first upper limit refers to a maximum quantity of zero power-reference signal resources included in one reference signal resource group.

The second upper limit refers to a maximum quantity of non zero power-reference signal resources included in one reference signal resource group. An amount of information reported at a time may be limited by configuring an upper limit value of a resource quantity, thereby reducing resource overheads.

Optionally, the second device may further set a lower limit in the configuration information, the lower limit is a constraint condition for reporting the information about the association relationship, and the lower limit refers to a minimum quantity of zero power-reference signal resources associated with a beam group.

Another aspect of this application provides a measurement reporting device, where the device includes at least one processor, a memory, a transmitter, and a receiver that are connected, the memory is configured to store program code, and the processor is configured to invoke the program code in the memory to perform the method described in the foregoing aspects.

Another aspect of this application provides a computer storage medium, including an instruction, where when the instruction is run on a computer, the computer is enabled to perform the method described in the foregoing aspects.

Another aspect of this application provides a computer program product including an instruction, where when the instruction is run on a computer, the computer is enabled to perform the method described in the foregoing aspects.

Compared with the prior art, in the solution provided in this application, after receiving the configuration information sent by the second device, the first device may report, based on a requirement of the configuration information, information that is measured on the zero power resource and that is about an association relationship between a downlink transmit beam and an interfering signal from another device, so that the second device can accurately learn the information about an association relationship between an interference beam interfering with the first device and the downlink transmit beam, instead of learning only information about an association relationship between downlink transmit beams of the second device and being incapable of performing targeted resource scheduling to avoid interference. It can be learned that the association relationship between the zero power-reference signal resource and the non zero power-reference signal resource is reported, so that the second device can perform targeted coordination based on the information about the association relationship when performing resource scheduling, and scheduling of beams with strong mutual interference in two cells is avoided, thereby reducing interference.

DESCRIPTION OF EMBODIMENTS

Figure 1:
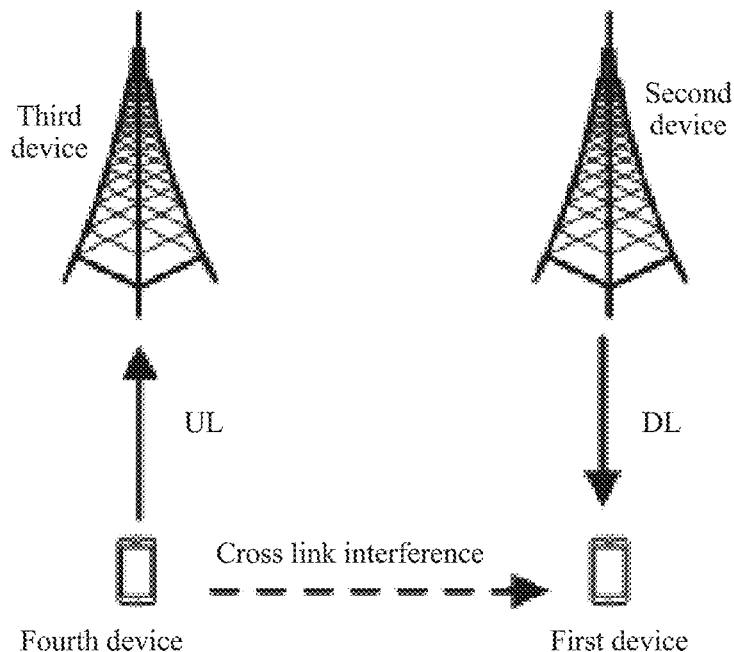
FIG. 1 is a schematic structural diagram of a network topology of a cross link.

In the specification, claims, and accompanying drawings of this application, terms "first", "second", and so on are intended to distinguish between similar objects but do not necessarily indicate a specific order or sequence. It should be understood that data used in such a manner is interchangeable in proper circumstances so that the embodiments described herein can be implemented in other orders than the order illustrated or described herein. In addition, terms "include", "have", or any other variant thereof are intended to cover non-exclusive inclusion. For example, a process, a method, a system, a product, or a device that includes a series of steps or modules is not necessarily limited to steps or modules that are expressly listed, but may include another step or module not expressly listed or inherent to the process, the method, the product, or the device. Module division in this application is merely logical division, and there may be another division during implementation in actual application. For example, a plurality of modules may be combined or integrated into another system, or some features may be ignored or not performed. In addition, displayed or discussed mutual couplings or direct couplings or communication connections may be implemented through some interfaces. The indirect couplings or communication connections between the modules may be implemented in electrical or another form, and this is not limited in this application. In addition, modules or sub-modules described as separate components may be or may not be physically separated, or may be or may not be physical modules, or may not be distributed into a plurality of circuit modules. Objectives of the solutions of this application may be achieved by selecting some or all of the modules based on actual requirements.

This application provides a measurement reporting method and a device, which are applicable to a wireless communications system, for example, applicable to an LTE system, or applicable to another wireless communications system, for example, a global system for mobile communications (English full name: Global System for Mobile Communication, English acronym: GSM), a mobile communications system (English full name: Universal Mobile Telecommunications Systemc, English acronym: UMTS), a code division multiple access (English acronym: CDMA) system, a new network system, and the like.

The wireless communications system includes at least one network side device, at least two relay devices, and at least two user side terminal devices. The network side device may be a base station or a transmission reception point, and may configure a resource for the relay device or the user side terminal device. The relay device may configure, for the user side terminal device, a resource for sending/receiving a reference signal. In a cross link interference scenario shown in FIG. 1, a first device and a fourth device may be user side terminal devices, and a second device and a third device may be network side devices (for example, base stations or transmission reception points). Identities of the first device, the second device, the third device, and the fourth device are not limited in this application.

Figure 2:
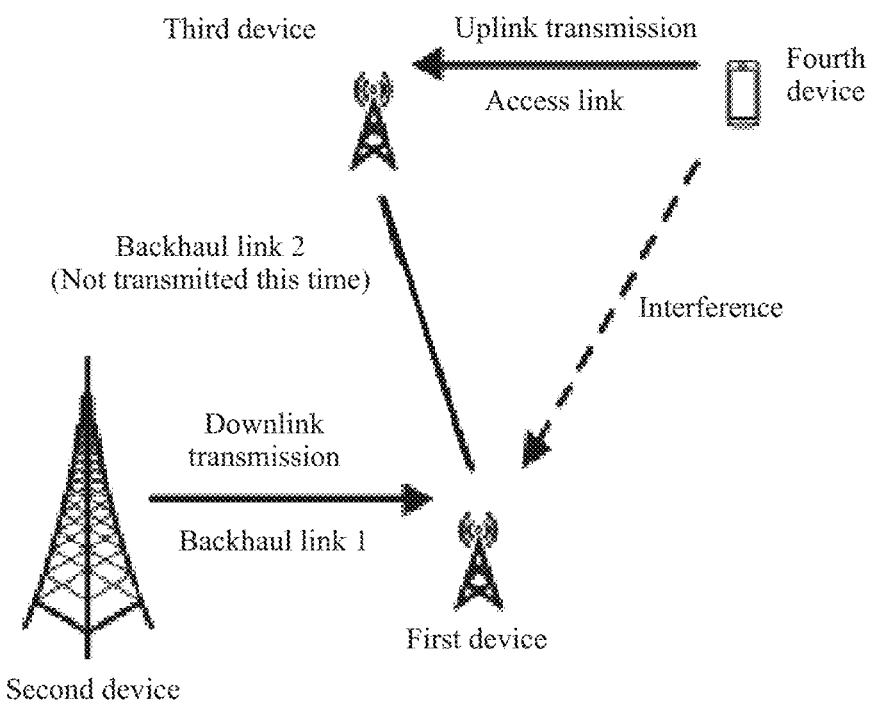
FIG. 2 is a schematic structural diagram of a network topology of a backhaul link.

In a schematic diagram of backhaul link interference shown in FIG. 2, the second device may be a network side device. The first device and the third device may alternatively be relay devices, and may provide relay services for the fourth device. The fourth device may be a user side terminal device. The second device may configure a resource, a reporting condition, and the like for the first device and the third device. In a scenario of improving a capacity of an antenna system by using space multiplexing, there are mainly the following a plurality of interference scenarios:

1. As shown in FIG. 1, when the first device and the fourth device are user side terminal devices, and the second device and the third device are base stations, the third device provides a service for the fourth device, and the second device provides a service for the first device. There may be cross link interference between downlink transmission of the first device and uplink transmission of the fourth device.

2. As shown in FIG. 2. When the first device and the third device are relay devices, and the second device is a base station, there is a backhaul link 1 between the first device and the second device, there is a backhaul link 2 between the first device and the third device, and there is an access link between the third device and the fourth device. When a time-frequency resource used in downlink transmission of the second device to the first device is the same as a time-frequency resource used in uplink transmission performed by the fourth device, there may be interference between the uplink transmission of the fourth device and downlink reception of the first device. The first device receives reference signals respectively from the second device and the fourth device, and the received reference signals may be used to measure beam quality/interference intensity. The first device may group, based on measured beam quality/interference intensity, resources of signals received from the second device and the fourth device, and then report resource grouping information to the second device, so that the second device obtains, based on the resource grouping information, combination information of beams of the second device and the fourth device that jointly interfere with the first device, thereby avoiding, through scheduling, simultaneously scheduling mutually interfered beams.

It should be specially noted that the network side device used in this application may be a device that enables a terminal device to access a wireless network, or may be referred to as a base station, including but not limited to: an evolved NodeB (English full name: evolved Node Base, English acronym: eNB), a transmission reception point (English acronym: TRP), a radio network controller (English acronym: RNC), a NodeB (English full name: Node B, English acronym: NB), a base station controller (English acronym: BSC), a base transceiver station (English acronym: BTS), a home eNodeB (for example, Home evolved NodeB, or Home Node B, English acronym: HNB), or a baseband unit (English acronym: BBU).

The used terminal device may be a device that provides voice and/or data connectivity for a user, a handheld device with a wireless connection function, or another processing device connected to a wireless modem. The wireless terminal may communicate with one or more core networks through a radio access network (English acronym: RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (English acronym: PCS) phone, a cordless telephone set, a session initiation protocol (SIP) phone, a wireless local loop (English acronym: WLL) station, or a personal digital assistant (English acronym: PDA). The wireless terminal may also be referred to as a system, a subscriber unit, a subscriber station, a mobile station, a mobile console (Mobile), a remote station, an access point, a remote terminal, an access terminal, a user terminal, a terminal device, a user agent, a user device, or user equipment To resolve the foregoing problem, this application mainly provides the following technical solution:

The base station or the transmission reception point delivers configuration information, where the configuration information may be used to configure a reference signal resource group. Then the terminal device determines an association relationship between resources, groups reference signal resources, and reports a status of reference signal resource group information to the base station, or directly reports an association relationship between reference signal resources to the base station.

The base station may determine, based on the reference signal resource group information, reference signal resources that have a correlation, may determine, based on the reference signal resource group information, beams corresponding to the reference signal resources, and then learns a corresponding beam group. The reference signal resource group information may include information about at least one reference signal resource group, and each reference signal resource group includes at least one reference signal resource. The reference signal resource may be a zero power-reference signal resource or a non zero power-reference signal resource. A zero power-reference signal is a reference signal mapped to the zero power-reference signal resource, and a non zero power-reference signal is a reference signal mapped to the non zero power-reference signal resource.

Figure 3:
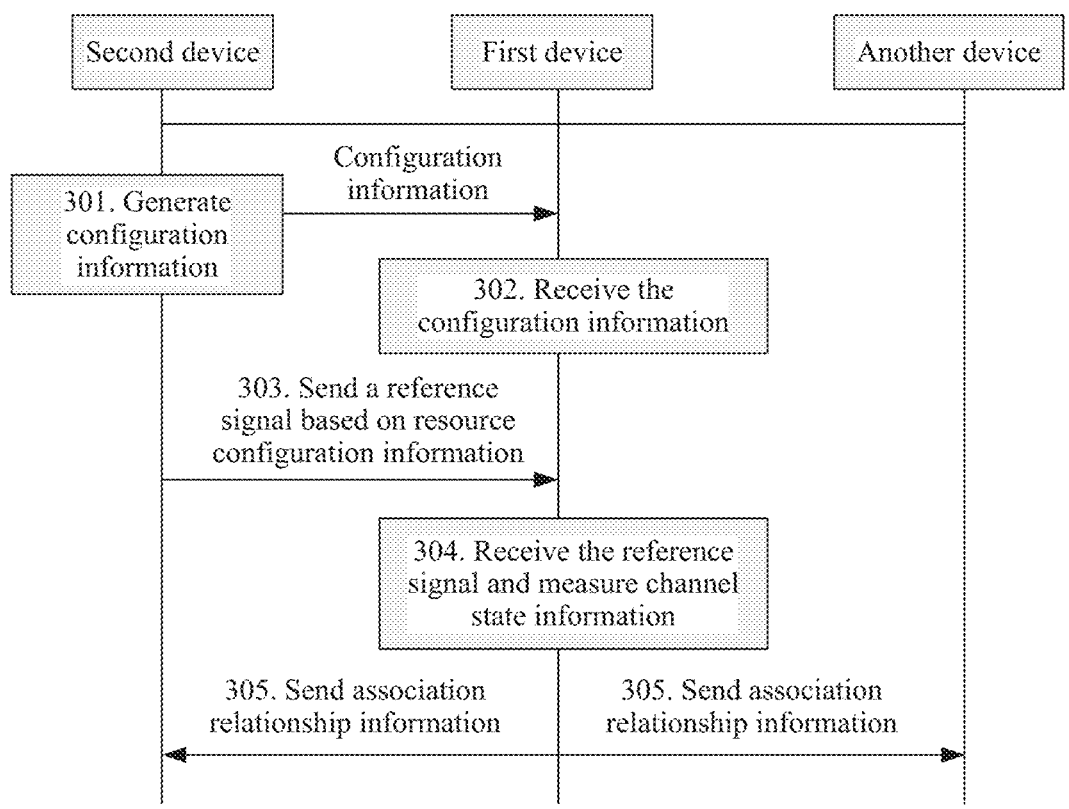
FIG. 3 is a schematic signaling interaction diagram of a measurement reporting method according to an embodiment of the present invention.

Referring to FIG. 3, the following describes a measurement reporting method provided in this application by using an example. The method mainly includes the following steps.

301. A second device generates configuration information, and sends the configuration information to a first device.

The configuration information is used to indicate report configuration information of the first device. The configuration information may be used to instruct the first device to report information about an association relationship between a zero power-reference signal resource and a non zero power-reference signal resource, or may be used to instruct the first device to report information about an association relationship between non zero power-reference signal resources.

Optionally, in some implementations, the configuration information sent by the second device includes a reference signal association relationship type instruction. There are two types of reference signal association relationships: One type of reference signal association relationship is an association relationship between a zero power-reference signal resource and a non zero power-reference signal resource, and the other type of reference signal association relationship is an association relationship between non zero power-reference signal resources.

In this way, the first device may be instructed to obtain, based on the configuration information sent by the second device, a reference signal association relationship type that needs to be fed back during reporting, and then feeds back the corresponding association relationship information to the second device. It can be teamed that the reference signal association relationship type instruction is configured, so that the first device can specify specific information that needs to be reported, instead of reporting all measurement information, thereby reducing overheads and improving resource utilization efficiency.

302. The first device receives the configuration information from the second device.

303. The second device sends a reference signal to the first device based on reference signal resource configuration information.

Before sending the reference signal to the first device, the second device further needs to configure reference signal resource configuration information for the first device and deliver the reference signal resource configuration information to the first device. The reference signal resource configuration information is used to configure, for the first device, a reference signal resource for measuring a reference signal. The reference signal may be a channel state information-reference signal measurement channel state information-reference signal (English acronym: CSI-RS).

A CSI-RS resource configured for the first device may include a zero power-reference signal (ZP-CSI-RS) resource and a non zero power-reference signal (NZP-CSI-RS) resource. A zero power-reference signal (ZP-CSI-RS) is mapped to a ZP-CSI-RS resource configured by the second device, and a non zero power-reference signal (NZP-CSI-RS) is mapped to an NZP-CSI-RS resource configured by the second device. The reference signal resource configuration information includes at least one of the following information: a time-frequency resource, a sequence, a period, and an antenna port, of the zero power-reference signal, and a time-frequency resource, a sequence, a period, and an antenna port of the non zero power-reference signal. Optionally, the periods of the zero power-reference signal and the non zero power-reference signal may be different. The second device may further set, in resource configuration information, information such as a period, a time-frequency resource, and a sequence of the CSI-RS resource. The reference signal is used to measure channel state information.

The ZP-CSI-RS resource is a zero power-reference signal resource. When the second device sends a reference signal on the ZP-CSI-RS resource, power of the sent reference signal is 0, and it may be considered that the second device essentially does not send a reference signal on the ZP-CSI-RS resource.

The ZP-CSI-RS resource is configured, so that the first device can measure, on the ZP-CSI-RS resource, interference information from a neighboring cell or another device, thereby learning an interference status. Interference to the neighboring cell or another device may also be avoided by configuring the ZP-CSI-RS resource. In some implementations, the ZP-CSI-RS resource may include at least two ZP-CSI-RS subresources. The ZP-CSI-RS subresources have non-neighboring and equally spaced subcarrier spacings. In other words, the ZP-CSI-RS resources are in a comb-tooth structure. In such a manner, data can be normally sent and received while reference signals are sent and received. Configuring the ZP-CSI-RS subresources can improve resource utilization.

The NZP-CSI-RS resource is a non zero power-reference signal resource. The second device or another device sends a non zero power reference signal on the NZP-CSI-RS resource.

In this way, the first device may receive reference signals on the ZP-CSI-RS resource and the NZP-CSI-RS resource, and then measure the reference signals received on the ZP-CSI-RS resource and the NZP-CSI-RS resource. In this way, a measurement value of a ZP-CSI-RS signal mapped to the ZP-CSI-RS resource and a measurement value of an NZP-CSI-RS signal mapped to the NZP-CSI-RS resource may be obtained.

The first device measures, on the zero power-reference signal resource, an SRS sent by another device. The SRS sent by the another device is configured by a third device. The another device may be a terminal device, for example, the fourth device shown in FIG. 1 and FIG. 2. The third device may be a network side device. The network side device may be a relay, a base station, or a transmission reception point, for example, the third device shown in FIG. 1 and FIG. 2.

304. The first device receives the reference signal, and performs measurement.

Specifically, the first device may receive signals separately on the ZP-CSI-RS resource and the NZP-CSI-RS resource that are confirmed by the second device for the first device, and finally obtain corresponding measurement results. The signal received by the first device may be the reference signal sent by the second device, or may be a reference signal sent by the another device, for example, the reference signal sent by the fourth device shown in FIG. 2.

305. The first device reports the information about the association relationship based on the configuration information.

The first device may send the information about the association relationship to the second device or another device. Optionally, in a multi-hop relay system, the first device also sends the information about the association relationship to the third device while sending the information about the association relationship to the second device. The third device may be a relay device. For example, the first device may also send the information about the association relationship to the third device in FIG. 2.

The information about the association relationship reported by the first device may be generated based on the measurement results of the signals received on the ZP-CSI-RS resource and the NZP-CSI-RS resource. The information about the association relationship may indicate an association relationship between a zero power-reference signal resource and a non zero power-reference signal resource, or may indicate an association relationship between non zero power-reference signal resources. A reference signal mapped to the zero power-reference signal resource is a zero power-reference signal; and a reference signal mapped to the non zero power-reference signal resource is a non zero power-reference signal.

After receiving the information about the association relationship reported by the first device, the second device may perform coordination based on the information about the association relationship when performing resource scheduling. It can be learned that, compared with an existing mechanism, in this embodiment of the present invention, the second device sends the configuration information to the first device, to instruct the first device to report, based on a requirement of the configuration information, information that is measured on the zero power resource and that is about an association relationship between a downlink transmit beam and an interfering signal from another device, so that the second device can accurately learn the information about an association relationship between an interference beam interfering with the first device and the downlink transmit beam (that is, learn resources on which the first device is interfered with), instead of learning only information about an association relationship between downlink transmit beams of the second device and being incapable of performing targeted resource scheduling to avoid interference. It can be learned that association relationship between the zero power-reference signal resource and the non zero power-reference signal resource is reported, so that the second device can learn a correspondence between mutually interfered beams and a transmit beam of the second device, and then the second device can perform targeted coordination based on the information about the association relationship when performing resource scheduling, and scheduling of beams with strong mutual interference in two cells is avoided, thereby reducing interference.

Optionally, in some embodiments of the present invention, the second device may further set at least one measurement threshold in the configuration information, the at least one measurement threshold is used to determine the information about the association relationship between the zero power-reference signal resource and the non zero power-reference signal resource, and respective measurement thresholds may be separately set for the zero power-reference signal resource and the non zero power-reference signal resource, or only one measurement threshold may be set. This is not specifically limited in this application.

Optionally, the configuration information includes one measurement threshold, and the measurement threshold is used to determine a measurement value of a reference signal mapped to the zero power-reference signal resource and a measurement value of a reference signal mapped to the non zero power-reference signal resource.

Optionally, the configuration information includes two measurement thresholds: a first measurement threshold and a second measurement threshold. The first measurement threshold is used to determine a measurement value of a reference signal mapped to the zero power-reference signal resource; and the second measurement threshold is used to determine a measurement value of a non-zero reference signal mapped to the non zero power-reference signal resource. The measurement threshold may alternatively be predefined in a protocol.

For example, the second device may further set at least one of the following reporting conditions in the configuration information:

1. a measurement value of a signal mapped to reference signal resources that have an association relationship is greater than the measurement threshold, and the reference signal is a signal mapped to a reference signal resource;

2. a measurement value of a signal mapped to reference signal resources that have no association relationship is less than the measurement threshold;

3. there is a spatial quasi co-location (English acronym: QCL) relationship between the zero power-reference signal resource and the non zero power-reference signal resource;

4. both a zero power-reference signal and a non zero power-reference signal may be received by the first device; or 5. a zero power-reference signal and a non zero power-reference signal may be received by the first device by using a same antenna array or a same antenna panel.

The reference signal resource is a zero power-reference signal resource or a non zero power-reference signal resource. The zero power-reference signal and the non zero power-reference signal may be used to measure channel state information. The reference signal may be a channel state information-reference signal CSI-RS, a modulation reference signal DMRS, a synchronization signal, or a reference signal in a synchronization signal block.

Specifically, the measurement threshold set in the configuration information may be used by the first device to determine whether there is an association relationship between reference signal resources. It can be learned that the following can be predefined or defined in the configuration information: There is an association relationship between reference signal resources greater than the measurement threshold, or there is an association relationship between reference signal resources less than the measurement threshold. For example, if it is defined that there is an association relationship between reference signal resources greater than the measurement threshold, when a measurement value of a reference signal is greater than a reference threshold, it is considered that there is an association relationship between reference signal resources to which the reference signal is mapped. If it is defined that there is an association relationship between reference signal resources less than the measurement threshold, when a measurement value of a reference signal is less than a reference threshold, it is considered that there is an association relationship between reference signal resources to which the reference signal is mapped.

If the second device sets a measurement threshold in the configuration information, the first device may further determine an association relationship (which is an association relationship between a ZP-CSI-RS resource and an NZP-CSI-RS resource, an association relationship between an NZP-CSI-RS resources, or an association relationship between ZP-CSI-RS resources) between reference signal resources based on a measurement value of a reference signal mapped to the reference signal resources. Optionally, respective measurement thresholds may be separately set for the ZP-CSI-RS resource and the NZP-CSI-RS resource, or only one measurement threshold may be configured. The association relationship between the ZP-CSI-RS resource and the NZP-CSI-RS resource is determined based on the specified measurement threshold. The respective thresholds that are separately set for the ZP-CSI-RS resource and the NZP-CSI-RS resource may be the same or different. A specific setting is not limited in this application.

There may be mainly the following two cases for indicating a measurement threshold by the configuration information:

When the configuration information includes one measurement threshold, the measurement threshold is used to determine a measurement value of a reference signal mapped to the zero power-reference signal resource and a measurement value of a reference signal mapped to the non zero power-reference signal resource.

The configuration information includes two measurement thresholds: a first measurement threshold and a second measurement threshold. The first measurement threshold is used to determine a measurement value of a reference signal mapped to the zero power-reference signal resource; and the second measurement threshold is used to determine a measurement value of a non-zero reference signal mapped to the non zero power-reference signal resource. The first measurement threshold and/or the second measurement threshold may be configured by the second device by using the configuration information, or may be predefined based on a protocol.

Optionally, the first measurement threshold may be set for both the ZP-CSI-RS resource and the NZP-CSI-RS resource. Alternatively, the first measurement threshold is set for the ZP-CSI-RS resource, and the second threshold is set for the NZP-CSI-RS resource. Alternatively, the first measurement threshold is set for the ZP-CSI-RS resource, and the second threshold is set for the NZP-CSI-RS resource.

For example, for determining, based on the measurement threshold, whether there is an association relationship between a ZP-CSI-RS resource and an NZP-CSI-RS resource, the second device may define the following in the configuration information:

A measurement value of a ZP-CSI-RS signal mapped to the ZP-CSI-RS resource is greater than the first measurement threshold, and a measurement value of art NZP-CSI-RS signal mapped to the NZP-CSI-RS resource is greater than the second measurement threshold; or a measurement value of a ZP-CSI-RS signal is less than the first measurement threshold and a measurement value of a signal mapped to the NZP-CSI-RS resource is less than the second measurement threshold.

The first device and the second device may predefine various reporting conditions in the configuration information, or the various reporting conditions may be configured and delivered by the second device to the first device. If the various reporting conditions in the configuration information are predefined, the second device may directly specify any of the various reporting conditions (for example, conditions described in 1 to 5) when sending the configuration information, to instruct the first device to determine whether a condition in the configuration information is met, and then report association relationship information meeting the conditions. Optionally, for example, the second device may directly add, to the configuration information, indexes of the foregoing reporting conditions, or a specified measurement type, where the specified measurement type may correspond to at least one of the foregoing conditions, so that the first device needs to select only a reference signal resource meeting the various conditions in the specified measurement type after receiving the configuration information. Optionally, both the second device and the first device may predefine a plurality of measurement types, and each measurement type corresponds to at least one of the foregoing conditions (the conditions described in 1 to 5). The second device needs to add only an index of a specified measurement type to the configuration information. A specific implementation is not limited in this application.

The reported association relationship information is generated based on the configuration information sent by the second device. The association relationship meets at least one of the following conditions:

(1) Both a zero power-reference signal measurement value and a non zero power-reference signal measurement value are greater than a first measurement threshold;

(2) a zero power-reference signal measurement value is greater than a first measurement threshold, and a non zero power-reference signal measurement value is greater than a second measurement threshold;

(3) both a zero power-reference signal measurement value and a non zero power-reference signal measurement value are less than a first measurement threshold;

(4) a zero power-reference signal measurement value is less than a first measurement threshold, and a non zero power-reference signal measurement value is less than a second measurement threshold;

(5) there is a spatial quasi co-location QCL relationship between the zero power-reference signal resource and the non zero power-reference signal resource;

(6) both a zero power-reference signal and a non zero power-reference signal may be received by the first device; or (7) a zero power-reference signal and a non zero power-reference signal may be received by the first device by using a same antenna array or a same antenna panel.

The non zero power-reference signal is a signal mapped to the non zero power-reference signal resource, and the zero power-reference signal is a signal mapped to the zero power-reference signal resource. Values of the first measurement threshold and the second measurement threshold are not limited in this application. The first measurement threshold and/or the second measurement threshold may be configured by the second device by using the configuration information, or may be predefined based on a protocol.

Optionally, in some implementations, the spatial QCL relationship in this application may mean that signals corresponding to signal antenna ports have a same QCL parameter; or the spatial QCL relationship means that the first device may determine, based on a QCL parameter of an antenna port, a QCL parameter of an antenna port that has a spatial QCL relationship with the antenna port; or the spatial QCL relationship means that two antenna ports have a same QCL parameter; or the spatial QCL relationship may mean that a difference between QCL parameters of two antenna ports is less than a threshold.

The QCL parameter may be at least one of the following: delay spread, Doppler spread, Doppler frequency shift, an average delay, an average gain, an angle of arrival (English acronym: ADA), an average AOA, AOA spread, an angle of departure (English acronym: AOD), an average angle of departure AOD, AOD spread, a receive antenna spatial correlation parameter, a transmit antenna spatial correlation parameter, a transmit beam, a receive beam, or a resource index.

The beam (including a transmit beam or a receive beam) includes at least one of precoding, a weight value sequence number, or a beam sequence number.

The angle (including an angle of arrival, an average angle of arrival, an angle of departure, or an average angle of departure) may be a decomposition value of a different dimension, or a combination of decomposition values of different dimensions.

The antenna ports are antenna ports having different antenna port numbers, and/or antenna ports that have a same antenna port number and that send or receive information at different times and/or in different frequencies and/or on different code domain resources, and/or antenna ports that have different antenna port numbers and that send or receive information at different times and/or in different frequency and/or on different code domain resources.

In some possible designs, it may be determined, based on a QCL parameter, whether there is a spatial QCL relationship between the zero power-reference signal resource and the non zero power-reference signal resource. The QCL parameter may be at least one of the following: delay spread, Doppler spread, Doppler frequency shift, an average delay, an average gain, an angle of arrival AOA, an average AOA, AOA spread, an angle of departure, an average angle of departure AOD, AOD spread, a receive antenna spatial correlation parameter, a transmit antenna spatial correlation parameter, a transmit beam, a receive beam, or a resource index.

For example, when the angle of arrival AOA is used to determine whether there is a spatial QCL relationship between the zero power-reference signal resource and the non zero power-reference signal resource, determining may be first performed based on a definition of the foregoing measurement threshold. Specifically, a value relationship between the angle of arrival AOA and the measurement threshold may be determined based on (1), (2), (3), or (4) in the association relationship. To be specific, an angle threshold may be set for the angle of arrival AOA, and if an angle of arrival AOA that is currently obtained through measurement is greater than the specified angle threshold, it indicates that there is an association relationship between reference signal resources whose angles of arrival AOAs are greater than the angle threshold. When another QCL parameter is used to determine an association relationship, refer to the description of determining an association relationship by using the angle of arrival AOA. Details are not described again subsequently.

Correspondingly, common features of a zero power-reference signal resource and a non zero power-reference signal resource that have no association relationship include one of the following:

(1) Both a zero power-reference signal measurement value and a non zero power-reference signal measurement value are less than a first measurement threshold;

(2) a zero power-reference signal measurement value is less than a first measurement threshold, and a non zero power-reference signal measurement value is less than a second measurement threshold;

(3) both a zero power-reference signal measurement value and a non zero power-reference signal measurement value are greater than a first measurement threshold:

(4) a zero power-reference signal measurement value is greater than a first measurement threshold, and a non zero power-reference signal measurement value is greater than a second measurement threshold;

(5) there is no spatial quasi co-location QCL relationship between the zero power-reference signal resource and the non zero power-reference signal resource;

(6) a zero power-reference signal and a non zero power-reference signal cannot be both received by the first device; or (7) a zero power-reference signal and a non zero power-reference signal cannot be received by the first device by using a same antenna array or a same antenna panel.

Specifically, in this embodiment of this application, the first device may determine whether there is an association relationship between a ZP-CSI-RS resource and an NZP-CSI-RS resource, or determine whether there is an association relationship between NZP-CSI-RS resources. The association relationship between a ZP-CSI-RS resource and an NZP-CSI-RS resource means as follows:

A measurement value of a ZP-CSI-RS signal mapped to the ZP-CSI-RS resource is greater than the measurement threshold, and a measurement value of a signal mapped to the NZP-CSI-RS resource is greater than the measurement threshold. In this case, it may be considered that there is an association relationship between these CSI-RS resources greater than the measurement threshold. The first device may group the two types of CSI-RS resources into a same reference signal resource group or different reference signal resource groups.

A measurement value of a ZP-CSI-RS signal mapped to the ZP-CSI-RS resource is less than the measurement threshold, and a measurement value of an NZP-CSI-RS signal mapped to the NZP-CSI-RS resource is less than the measurement threshold. In this case, it may be considered that there is no association relationship between these CSI-RS resources less than the measurement threshold. The first device may group the two types of CSI-RS resources into a same reference signal resource group or different reference signal resource groups.

Figure 4:
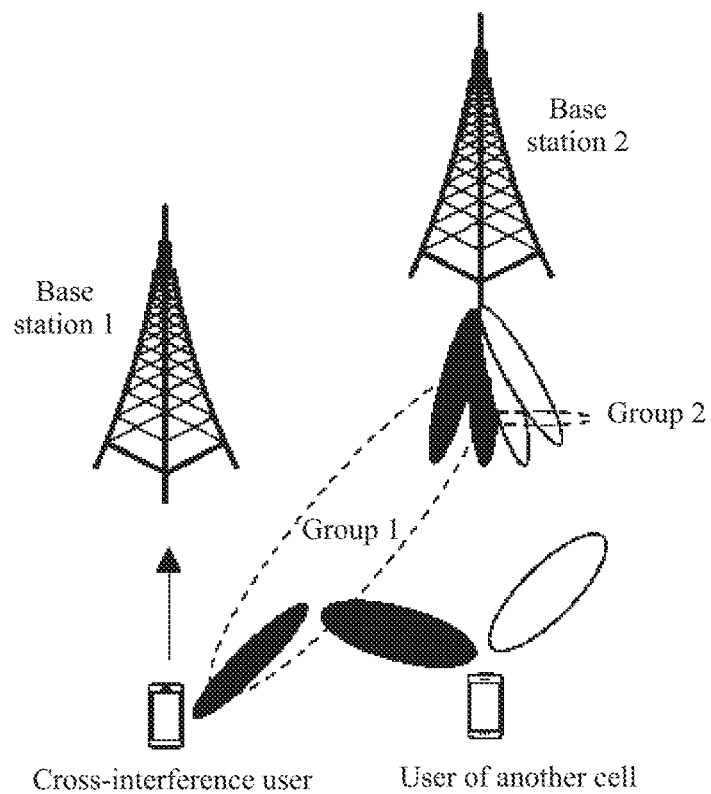
FIG. 4 is a schematic diagram of grouping reference signal resources on a cross link.

It should be noted that, for CSI-RS resources in a same reference signal resource group, there is an association relationship between all the CSI-RS resources in the same reference signal resource group, or there is no association relationship between any CSI-RS resources in the same reference signal resource group. A beam group corresponds to a reference signal resource group, and a beam corresponds to a reference signal resource. In some implementations, CSI-RS resources participating in the current measurement may be grouped into two reference signal resource groups based on the measurement threshold: One reference signal resource group includes only a CSI-RS resource whose measurement value is greater than the measurement threshold, and the other reference signal resource group includes only a CSI-RS resource whose measurement value is less than the measurement threshold. For example, as shown in FIG. 4, a cross-interference user groups received beams, a group 1 indicated by a dotted circle is a group of beams interfering with the cross-interference user, and a group 2 indicates a group of beams that do not interfere with the cross-interference user. There is an association relationship between the beams in the group 1, in other words, the beams in the group 1 have a strong correlation. There is no association relationship between the beams in the group 2, in other words, the beams have a weak correlation or have no correlation. Therefore, the cross-interference user may report only a status of the group 1 to a base station 1 to which the cross-interference user belongs.

The reference signal resource index includes a channel state information-reference signal (English full name: channel state information reference signal, English acronym: CSI-RS) resource index, or an SRS resource index, or a resource index of a synchronization signal/a synchronization signal block, or a resource index of a preamble sequence transmitted on a physical random access channel (English acronym: PRACH), or a resource index of a demodulation reference signal (English acronym: DMRS), and is used to indicate a beam on the resource.

For example, a spatial QCL relationship between downlink signals or a spatial QCL relationship between uplink signals may mean that the two signals have a same AOA or AOD, which is used to indicate that the two signals have a same receive beam or transmit beam.

For another example, a spatial QCL relationship between a downlink signal and an uplink signal or a spatial QCL relationship between an uplink signal and a downlink signal may mean that there is a correspondence between AOAs and AODs of the two signals, or there is a correspondence between AODs and AOAs of the two signals, in other words, a beam correspondence may be used to determine an uplink transmit beam based on a downlink receive beam, or determine a downlink receive beam based on an uplink transmit beam.

Signals having a spatial QCL relationship may alternatively be understood as having a corresponding beam. The corresponding beam includes at least one of the following: a same receive beam, a same transmit beam, a transmit beam corresponding to a receive beam, or a receive beam corresponding to a transmit beam.

Signals having a spatial QCL relationship may alternatively be understood as having a corresponding beam pair link (English acronym: BPL). The corresponding BPL includes at least one of the following: a same downlink BPL, a same uplink BPL, an uplink BPL corresponding to a downlink BPL, or a downlink BPL corresponding to an uplink BPL.

Optionally, in some embodiments of the present invention, the first device may report an association relationship between reference signal resources to the second device, or may report reference signal resource group information of each reference signal resource, or may report a mapping relationship between reference signal resources. In other words, the information about the association relationship may include an association relationship between reference signal resources, or may include reference signal resource group information of each reference signal resource, or may include a mapping relationship between a zero power-reference signal resource and a non zero power-reference signal resource. It should be noted that the association relationship between reference signal resources may reflect a correlation between the reference signal resources, and finally a correlation between beams is reflected. Descriptions are provided below separately.

1. If the reported association relationship information includes reference signal resource group information of at least one reference signal resource group, each reference signal resource group may include at least one zero power-reference signal resource.

Each piece of reference signal resource group information may include at least one reference signal resource index, the at least two reference signal resource indexes may correspond to at least one reference signal resource group, and one reference signal resource index corresponds to one reference signal resource.

Optionally, the reference signal resource group information includes a group number of the reference signal resource group.

Optionally, the reference signal resource group includes at least one zero power-reference signal resource and at least one non zero power-reference signal resource, and there is an association relationship between a zero power-reference signal resource and a non zero power-reference signal resource that belong to a same reference signal resource group.

Optionally, the reference signal resource group includes at least one zero power-reference signal resource and at least one non zero power-reference signal resource, and there is no association relationship between a zero power-reference signal resource and a non zero power-reference signal resource that belong to a same reference signal resource group.

Optionally, the reference signal resource group includes at least one zero power-reference signal resource and the reference signal group does not include any non zero power-reference signal resource, there is an association relationship between zero power-reference signal resources that belong to a same reference signal resource group, and the reference signal resource group corresponds to at least one non zero power-reference signal resource. The reference signal resource includes at least one of a time domain resource, a frequency domain resource, a code domain a resource, and an antenna port.

Specifically, for a reference signal resource in the reference signal resource group, one of the following conditions may be included:

The non zero power-reference signal resource and the zero power-reference signal resource that have the association relationship belong to a same reference signal resource group. For example, a reference signal resource group includes a ZP-CSI-RS resource and an NZP-CSI-RS resource, and these CSI-RS resources have an association relationship with each other.

The non zero power-reference signal resource and the zero power-reference signal resource that have the association relationship belong to different reference signal resource groups. For example, a reference signal resource group includes a ZP-CSI-RS resource and an NZP-CSI-RS resource, and these CSI-RS resources have no association relationship with each other.

The reference signal resource group includes only zero power-reference signal resources, these zero power-reference signal resources have an association relationship between each other, and these zero power-reference signal resources correspond to at least one non zero power-reference signal resource. In other words, the zero power-reference signal resource belongs to a reference signal resource group corresponding to the non zero power-reference signal resource that has the association relationship with the zero power-reference signal resource.

The reference signal resource group includes only zero power-reference signal resources, these zero power-reference signal resources have no association relationship between each other, and these zero power-reference signal resources correspond to at least one non zero power-reference signal resource. In other words, the zero power-reference signal resource belongs to a reference signal resource group corresponding to the non zero power-reference signal resource that has the association relationship with the zero power-reference signal resource.

The reference signal resource group includes only non zero power-reference signal resources, and these non zero power-reference signal resources have an association relationship between each other.

Alternatively, the reference signal resource group includes only non zero power-reference signal resources, and these non zero power-reference signal resources have no association relationship between each other.

It can be learned that, after the reference signal resources are grouped by using the configuration information, resources having an association relationship fall within a same reference signal resource group, resources having an association relationship fall within different reference signal resource groups, or resources having no association relationship fall within a same reference signal resource group. In other words, for a relationship between reference signal resources in a reference signal resource group, the following cases may be included: there is an association relationship between reference signal resources in a same reference signal resource group, and there is no association relationship between reference signal resources in a same reference signal resource group. Resources having an association relationship may be grouped into a same reference signal resource group or may be grouped into different reference signal resource groups. There may be an association relationship between every two reference signal resources in a reference signal resource group partially, or there is no association relationship between any two reference signal resources in a reference signal resource group.

Optionally, the reference signal resource group information may include an index of a reference signal resource that belongs to the reference signal resource group. Each piece of reference signal resource group information may further include one of the following:

(a) a resource index of at least one zero power-reference signal resource that has an association relationship with a non zero power-reference signal resource, where if it is determined through measurement that there is interference from another cell in the current measurement, only a resource index of the ZP-CSI-RS resource may be reported, and the reported ZP-CSI-RS resource is a reference signal resource having an association relationship with the NZP-CSI-RS resource;

(b) a resource index of at least one non zero power-reference signal resource, where for example, when the first device determines through measurement that there is at least one NZP-CSI-RS resource that meets a condition in the configuration information in the current measurement, it indicates that the first device is interfered with by another cell, and in this case, the first device may report resource indexes of these NZP-CSI-RS resources; or if it is determined through measurement that there is no NZP-CSI-RS resource that meets a condition in the configuration information in the current measurement, it indicates that the local cell is not interfered by another cell in the current measurement, and therefore, there is no need to report a result of the current measurement, and in this case, unnecessary overheads of the first device can be reduced: or (c) a resource index of at least one zero power-reference signal resource that has no association relationship with a non zero power-reference signal resource.

In some implementations, the different reference signal resource groups may include a same reference signal resource index, in other words, one reference signal resource index may correspond to at least one reference signal resource group.

In some implementations, a measurement value of a signal mapped to each reference signal resource may be further reported in the reported association relationship information. The measurement value may be in a form of reference signal received power (English acronym: RSRP), a received signal strength indicator (English acronym: RSSI), reference signal received quality (English acronym: RSRQ), or the like. A measurement value that is determined by using a measurement value corresponding to an NZP-CSI-RS resource and a measurement value corresponding to a ZP-CSI-RS resource may be further reported, for example, a power measurement indicator (English acronym: PMI), a reference indicator (English acronym: RI), or a channel quality indicator (English acronym: CQI).

2. If the reported association relationship information includes the mapping relationship, the information about the association relationship includes at least one of the following:

(a) a mapping relationship between information about at least one zero power-reference signal and information about at least one non zero power-reference signal: or (b) information about at least one non zero power-reference signal; or (c) information about at least one reference signal, and information about another reference signal that has an association relationship with the reference signal; or (d) information about at least one reference signal, and information about another reference signal that has no association relationship with the at least one reference signal.

The reference signal is a zero power-reference signal or a non zero power-reference signal.

The mapping relationship is reported, so that the second device can coordinate resources of the first device, thereby avoiding interference caused because beams in a same beam group are scheduled in two cells.

Optionally, in some embodiments of the present invention, after completing the measurement, the first device may group, based on the configuration information, reference signal resources participating in each measurement, to obtain at least one reference signal resource group. For completed grouping of reference signal resources, there is an association relationship between reference signal resources in at least one reference signal resource group, or there is no association relationship between reference signal resources in at least one reference signal resource group. For a case of grouping reference signal resources having an association relationship into a same reference signal resource group, all the reference signal resources in the reference signal resource group may be considered as an interfering resource that interferes with a cell to which the first device belongs. Resources having no association relationship may be considered as resources that do not interfere with the cell to which the first device belongs, or considered as resources that have interference that is relatively small or even ignorable to the local cell. In such a resource grouping manner, an accurate interfering resource can be reported to the second device, so that the second device can perform targeted resource scheduling, and finally, a better resource can also be configured for the first device.

Optionally, in some embodiments of the present invention, the information about the association relationship further includes an association relationship between the zero power-reference signal resource in the reference signal resource group and a beam group, the beam group corresponds to the reference signal resource group, or the beam group is a beam set with or without a correlation, and a beam corresponds to a received reference signal.

The beam set with a correlation is a set of beams corresponding to a resource whose measurement value is greater than the measurement threshold; and the beam set without a correlation is a set of beams corresponding to a resource whose measurement value is less than the measurement threshold. It is assumed that the second device already performs beam grouping on the NZP-CSI-RS signal sent by the first device end. Therefore, the first device needs to report only a relationship between an interfering resource (namely, the ZP-CSI-RS resource) that interferes with the local cell and a beam group.

Optionally, in some embodiments of the present invention, from a perspective of resource overheads, the second device may further set at least one of a first upper limit and a second upper limit in the configuration information. The first upper limit refers to a maximum quantity of zero power-reference signal resources included in one reference signal resource group.

The second upper limit refers to a maximum quantity of non zero power-reference signal resources included in one reference signal resource group. An amount of information reported at a time may be limited by configuring an upper limit value of a resource quantity, thereby reducing resource overheads.

Optionally, in some embodiments of the present invention, the configuration information further includes a lower limit, the lower limit is a constraint condition for reporting the information about the association relationship, and the lower limit refers to a minimum quantity of zero power-reference signal resources associated with a beam group. When a quantity of the ZP-CSI-RS resources is less than the lower limit, it may be considered that there is a relatively small quantity of interfering beams from another device, in other words, interference obtained through measurement this time falls within a range acceptable to the first device. In this case, the interference obtained through measurement this time may be ignored, and therefore, there is no need to report ZP-CSI-RS resources obtained through measurement this time, thereby reducing overheads. In other words, the first device reports the association relationship only when a quantity of ZP-CSI-RS resources associated with a beam group is greater than the lower limit.

For ease of understanding, that the first device is a relay device and the second device is a base station is used as an example below to provide a description for the association relationship. The base station configures a ZP-CSI-RS resource and an NZP-CSI-RS resource for the relay device. The relay device receives signals on the two types of CSI-RS resources, and separately measures the received signals. If a signal is received on the ZP-CSI-RS resource and a measurement value of the signal mapped to the ZP-CSI-RS resource is greater than the measurement threshold, because a signal sent by the base station on the ZP-CSI-RS resource is a zero power signal, all measurement values obtained on the ZP-CSI-RS resource currently are from signals sent by another device on a same time-frequency resource, and then, it may be considered that there is interference on the ZP-CSI-RS resource. In this case, the ZP-CSI-RS resource may be grouped into a to-be-reported reference signal resource group; otherwise, the ZP-CSI-RS resource does not need to be grouped into a to-be-reported reference signal resource group. In other words, if at least one reference signal resource index reported by the relay device to the base station does not include a resource index of the ZP-CSI-RS resource, it may be considered that there is no resource with interference in the current measurement. In this way, resource indexes of these reference signal resources do not need to be reported. Certainly, resource indexes of these reference signal resources may alternatively be reported. A specific selected reporting item may be determined based on configuration information delivered by the base station or may be determined by the relay device. This is not limited in this application.

In some implementations, an association relationship between CSI-RS resources may reflect a correlation between the CSI-RS resources, and finally a correlation between beams is reflected. The correlation between the beams means that there is interference between the beams, that is, interference caused by resource utilization when signals are sent/received at a same angle or at different angles with a relatively small difference. A greater correlation indicates stronger interference and a lower gain of an antenna system. Therefore, in this application, beams whose correlation exceeds a range needs to be identified, and specifically, a corresponding CSI-RS resource may be used for the identification. In other words, a reference signal is measured, so that the second device can schedule a resource of the second device provided that a correlation between CSI-RS resources is identified and reported to the second device, to reduce interference from a cross link, or interference in a relay system, thereby facilitating MIMO data transmission.

A correlation between transmit beams may be expressed by using a formula $\Theta_T = K_T K_T^H$, where $K_T$ is a lower triangular matrix of $n_T \times n_T$, and a diagonal element is a positive value, and may be obtained through decomposition by using a Cholesky matrix.

Optionally, in some embodiments of the present invention, in the schematic structural diagram of the network topology shown in FIG. 2, the second device may alternatively report the reference signal resource group information to the first device by using a reporting mechanism that is the same as that of the cross link interference. In addition, the first device sends the reference signal resource group information to the third device by using a grouping method that is the same as that for the cross link interference.

Optionally, the first device reports information (where the information may include a resource index, and may further include a measurement value) about an NZP-CSI-RS resource in the reference signal resource group and a group number to the second device by using a grouping method that is the same as that in the cross link interference scenario. In addition, the first device may alternatively send information (where the information may include a resource index, and may further include a measurement value) about a ZP-CSI-RS resource in the reference signal resource group and a group identifier of the reference signal resource group to the third device.

Figure 5:
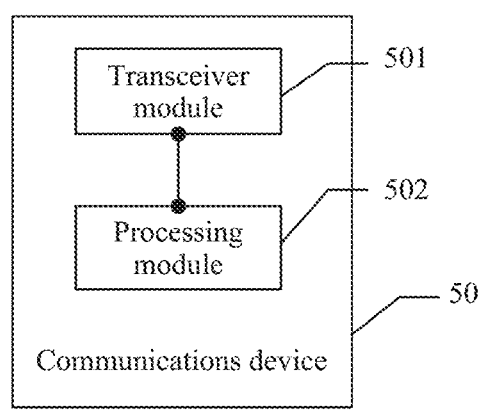
FIG. 5 is a schematic structural diagram of a first device according to an embodiment of the present invention.

Features such as the configuration information, the information about the association relationship, the association relationship, the measurement threshold, the reference signal association relationship type instruction, and the reference signal resource group are also applicable to the embodiments corresponding to FIG. 4 and FIG. 5 in this application. Similarities are not repeated subsequently.

A measurement reporting method in this application is described above. A device and a communications system for performing the measurement reporting method are separately described below.

1. Referring to FIG. 5, a communications device 50 is described. The communications device 50 includes a transceiver module 501 and a processing module 502. The processing module 502 is configured to control sending and receiving operations of the transceiver module 501. The communications device 50 may perform the steps performed by the first device in the embodiment corresponding to FIG. 3 or FIG. 4, and the description of the first device in the embodiment corresponding to FIG. 3 or FIG. 4 is also applicable to the communications device 50 in this embodiment.

In a measurement reporting process, the transceiver module 501 is configured to: receive configuration information from a second device 60, where the configuration information is used by the first device to report information about an association relationship between a zero power-reference signal resource and a non zero power-reference signal resource; and report the information about the association relationship based on the configuration information received by the transceiver module 501.

Optionally, the configuration information includes a reference signal association relationship type instruction, and the reference signal association relationship type instruction is used to instruct the first device to report the information about the association relationship between the zero power-reference signal resource and the non zero power-reference signal resource.

In this embodiment of the present invention, after the transceiver module 501 receives the configuration information sent by the second device, the processing module 502 may report, based on a requirement of the configuration information, information that is measured on the zero power resource and that is about an association relationship between a downlink transmit beam and an interfering signal from another device, so that the second device can accurately learn the information about an association relationship between an interference beam interfering with the first device and the downlink transmit beam, instead of learning only information about an association relationship between downlink transmit beams of the second device and being incapable of performing targeted resource scheduling to avoid interference. It can be learned that the association relationship between the zero power-reference signal resource and the non zero power-reference signal resource is reported, so that the second device can perform targeted coordination based on the information about the association relationship when performing resource scheduling, and scheduling of beams with strong mutual interference in two cells is avoided, thereby reducing interference.

Optionally, the configuration information includes at least one measurement threshold, and the at least one measurement threshold is used to determine the association relationship between the zero power-reference signal resource and the non zero power-reference signal resource.

Optionally, the association relationship includes one of the following:

(1) Both a zero power-reference signal measurement value and a non zero power-reference signal measurement value are greater than a first measurement threshold;

(2) a zero power-reference signal measurement value is greater than a first measurement threshold, and a non zero power-reference signal measurement value is greater than a second measurement threshold;

(3) both a zero power-reference signal measurement value and a non zero power-reference signal measurement value are less than a first measurement threshold;

(4) a zero power-reference signal measurement value is less than a first measurement threshold, and a non zero power-reference signal measurement value is less than a second measurement threshold;

(5) there is a spatial quasi co-location QCL relationship between the zero power-reference signal resource and the non zero power-reference signal resource;

(6) both a zero power-reference signal and a non zero power-reference signal may be received by the first device; or (7) a zero power-reference signal and a non zero power-reference signal may be received by the first device by using a same antenna array or a same antenna panel.

The zero power-reference signal is a signal mapped to the zero power-reference signal resource, and the non zero power-reference signal is a signal mapped to the non zero power-reference signal resource. The first measurement threshold and/or the second measurement threshold may be configured by the second device by using the configuration information, or may be predefined based on a protocol.

In some possible designs, it may be determined, based on a QCL parameter, whether there is a spatial QCL relationship between the zero power-reference signal resource and the non zero power-reference signal resource. The QCL parameter may be at least one of the following: delay spread, Doppler spread, Doppler frequency shift, an average delay, an average gain, an angle of arrival AOA, an average AOA, AOA spread, an angle of departure, an average angle of departure AOD, AOD spread, a receive antenna spatial correlation parameter, a transmit antenna spatial correlation parameter, a transmit beam, a receive beam, or a resource index.

For example, when the angle of arrival AOA is used to determine whether there is a spatial QCL relationship between the zero power-reference signal resource and the non zero power-reference signal resource, determining may be first performed based on a definition of the foregoing measurement threshold. Specifically, a value relationship between the angle of arrival AOA and the measurement threshold may be determined based on (1), (2), (3), or (4) in the association relationship. To be specific, an angle threshold may be set for the angle of arrival AOA, and if an angle of arrival AOA that is currently obtained through measurement is greater than the specified angle threshold, it indicates that there is an association relationship between reference signal resources whose angles of arrival AOAs are greater than the angle threshold. When another QCL parameter is used to determine an association relationship, refer to the description of determining an association relationship by using the angle of arrival AOA. Details are not described again subsequently.

Optionally, the information about the association relationship includes reference signal resource group information of at least one reference signal resource group, and each reference signal resource group includes at least one zero power-reference signal resource.

Each piece of reference signal resource group information may include at least one reference signal resource index, the at least two reference signal resource indexes may correspond to at least one reference signal resource group, and one reference signal resource index corresponds to one reference signal resource.

Optionally, the reference signal resource group information includes a group number of the reference signal resource group.

Optionally, the reference signal resource group includes at least one zero power-reference signal resource and at least one non zero power-reference signal resource, and there is an association relationship between a zero power-reference signal resource and a non zero power-reference signal resource that belong to a same reference signal resource group.

Optionally, the reference signal resource group includes at least one zero power-reference signal resource and at least one non zero power-reference signal resource, and there is no association relationship between a zero power-reference signal resource and a non zero power-reference signal resource that belong to a same reference signal resource group.

Optionally, the reference signal resource group includes at least one zero power-reference signal resource and the reference signal resource group does not include any non zero power-reference signal resource, there is an association relationship between zero power-reference signal resources that belong to a same reference signal resource group, and the reference signal resource group corresponds to at least one non zero power-reference signal resource. The reference signal resource includes at least one of a time domain resource, a frequency domain resource, a code domain a resource, and an antenna port.

Specifically, for a reference signal resource in the reference signal resource group, one of the following conditions may be included:

The non zero power-reference signal resource and the zero power-reference signal resource that have the association relationship belong to a same reference signal resource group. For example, a reference signal resource group includes a ZP-CSI-RS resource and an NZP-CSI-R. S resource, and these CSI-RS resources have an association relationship with each other.

The non zero power-reference signal resource and the zero power-reference signal resource that have the association relationship belong to different reference signal resource groups. For example, a reference signal resource group includes a ZP-CSI-RS resource and an NZP-CSI-RS resource, and these CSI-RS resources have no association relationship with each other.

The reference signal resource group includes only zero power-reference signal resources, these zero power-reference signal resources have an association relationship between each other, and these zero power-reference signal resources correspond to at least one non zero power-reference signal resource.

The reference signal resource group includes only zero power-reference signal resources, these zero power-reference signal resources have no association relationship between each other, and these zero power-reference signal resources correspond to at least one non zero power-reference signal resource.

The reference signal resource group includes only non zero power-reference signal resources, and these non zero power-reference signal resources have an association relationship between each other.

Alternatively, the reference signal resource group includes only non zero power-reference signal resources, and these non zero power-reference signal resources have no association relationship between each other.

In some possible designs, each piece of reference signal resource group information may include one of the following:

a resource index of at least one zero power-reference signal resource, where a zero power-reference signal resource corresponding to the resource index of the zero power-reference signal resource that is included in the at least one resource index corresponds to at least one non zero power-reference signal resource; or a resource index of at least one non zero power-reference signal resource; or a resource index of at least one zero power-reference signal resource that has no association relationship with a non zero power-reference signal resource.

In some possible designs, the reference signal resource group information includes at least one of the following:

a mapping relationship between information about at least one zero power-reference signal and information about at least one non zero power-reference signal; or information about at least one non zero power-reference signal; or information about at least one reference signal, and information about another reference signal that has an association relationship with the reference signal; or information about at least one reference signal, and information about another reference signal that has no association relationship with the at least one reference signal.

The reference signal is a zero power-reference signal or a non zero power-reference signal.

Optionally, the second device may further set at least one of a first upper limit and a second upper limit in the configuration information. The first upper limit refers to a maximum quantity of zero power-reference signal resources included in one reference signal resource group.

The second upper limit refers to a maximum quantity of non zero power-reference signal resources included in one reference signal resource group. An amount of information reported at a time may be limited by configuring an upper limit value of a resource quantity, thereby reducing resource overheads.

Optionally, the second device may further set a lower limit in the configuration information, the lower limit is a constraint condition for reporting the information about the association relationship, and the lower limit refers to a minimum quantity of zero power-reference signal resources associated with a beam group.

Figure 6:
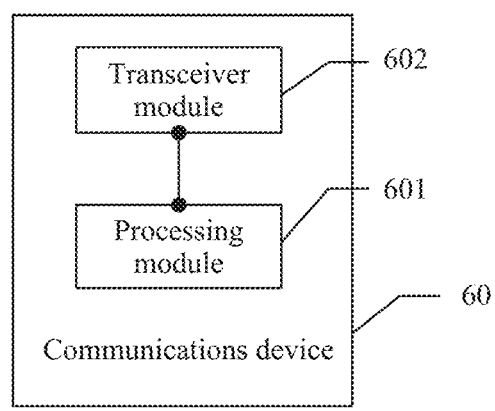
FIG. 6 is a schematic structural diagram of a second device according to an embodiment of the present invention.

2. Referring to FIG. 6, a communications device 60 is described. The communications device 60 includes a processing module 601 and a transceiver module 602. The second device 60 may perform the steps performed by the second device in the embodiment corresponding to FIG. 3 or FIG. 4, and the description of the second device in the embodiment corresponding to FIG. 3 or FIG. 4 is also applicable to the communications device 60 in this embodiment.

In a measurement reporting process, the processing module 601 is configured to generate configuration information.

The transceiver module 602 is configured to send the configuration information generated by the processing module 601 to a first device.

The configuration information is used by the first device to report information about an association relationship between a zero power-reference signal resource and a non zero power-reference signal resource.

The transceiver module 602 is further configured to receive the information about the association relationship reported by the first device 50 based on the configuration information.

In this embodiment of the present invention, after the processing module 601 generates the configuration information, the transceiver module 602 sends the configuration information to the first device, so that the first device may report, based on a requirement of the configuration information, information that is measured on the zero power resource and that is about an association relationship between a downlink transmit beam and an interfering signal from another device. In this way, the second device can accurately learn the information about an association relationship between an interference beam interfering with the first device and the downlink transmit beam, instead of learning only information about an association relationship between downlink transmit beams of the second device and being incapable of performing targeted resource scheduling to avoid interference. It can be learned that the association relationship between the zero power-reference signal resource and the non zero power-reference signal resource is reported, so that the second device can perform targeted coordination based on the information about the association relationship when performing resource scheduling, and scheduling of beams with strong mutual interference in two cells is avoided, thereby reducing interference.

Optionally, the configuration information includes a reference signal association relationship type instruction, and the reference signal association relationship type instruction is used to instruct the first device to report the information about the association relationship between the zero power-reference signal resource and the non zero power-reference signal resource.

Optionally, the configuration information includes at least one measurement threshold, and the at least one measurement threshold is used to determine the association relationship between the zero power-reference signal resource and the non zero power-reference signal resource.

Optionally, the configuration information includes at least one of the following:

a measurement value of a signal mapped to reference signal resources that have an association relationship is greater than a measurement threshold;

a measurement value of a signal mapped to reference signal resources that have no association relationship is less than the measurement threshold;

there is a spatial quasi co-location QCL relationship between the zero power-reference signal resource and the non zero power-reference signal resource;

both a zero power-reference signal and a non zero power-reference signal may be received by the first device; or a zero power-reference signal and a non zero power-reference signal may be received by the first device by using a same antenna array or a same antenna panel.

The reference signal resource is the zero power-reference signal resource or the non zero power-reference signal resource, the non zero power-reference signal corresponds the non zero power-reference signal resource, and the zero power-reference signal corresponds the zero power-reference signal resource.

Optionally, the association relationship includes one of the following:

(1) Both a zero power-reference signal measurement value and a non zero power-reference signal measurement value are greater than a first measurement threshold;

(2) a zero power-reference signal measurement value is greater than a first measurement threshold, and a non zero power-reference signal measurement value is greater than a second measurement threshold;

(3) both a zero power-reference signal measurement value and a non zero power-reference signal measurement value are less than a first measurement threshold;

(4) a zero power-reference signal measurement value is less than a first measurement threshold, and a non zero power-reference signal measurement value is less than a second measurement threshold;

(5) there is a spatial quasi co-location QCL relationship between the zero power-reference signal resource and the non zero power-reference signal resource;

(5) both a zero power-reference signal and a non zero power-reference signal may be received by the first device; or (6) a zero power-reference signal and a non zero power-reference signal may be received by the first device by using a same antenna array or a same antenna panel.

The zero power-reference signal is a signal mapped to the zero power-reference signal resource, and the non zero power-reference signal is a signal mapped to the non zero power-reference signal resource.

Optionally, the information about the association relationship includes reference signal resource group information of the reference signal resource, and each reference signal resource group includes at least one zero power-reference signal resource.

Each piece of reference signal resource group information may include at least one reference signal resource index, the at least two reference signal resource indexes may correspond to at least one reference signal resource group, and one reference signal resource index corresponds to one reference signal resource.

Optionally, the reference signal resource group information includes a group number of the reference signal resource group.

Optionally, the reference signal resource group includes at least one zero power-reference signal resource and at least one non zero power-reference signal resource, and there is an association relationship between a zero power-reference signal resource and a non zero power-reference signal resource that belong to a same reference signal resource group.

Optionally, the reference signal resource group includes at least one zero power-reference signal resource and at least one non zero power-reference signal resource, and there is no association relationship between a zero power-reference signal resource and a non zero power-reference signal resource that belong to a same reference signal resource group.

Optionally, the reference signal resource group includes at least one zero power-reference signal resource and the reference signal group does not include any non zero power-reference signal resource, there is an association relationship between zero power-reference signal resources that belong to a same reference signal resource group, and the reference signal resource group corresponds to at least one non zero power-reference signal resource. The reference signal resource includes at least one of a time domain resource, a frequency domain resource, a code domain a resource, and an antenna port.

Specifically, for a reference signal resource in the reference signal resource group, one of the following conditions may be included:

The non zero power-reference signal resource and the zero power-reference signal resource that have the association relationship belong to a same reference signal resource group. For example, a reference signal resource group includes a ZP-CSI-RS resource and an NZP-CSI-RS resource, and these CSI-RS resources have an association relationship with each other.

The non zero power-reference signal resource and the zero power-reference signal resource that have the association relationship belong to different reference signal resource groups. For example, a reference signal resource group includes a ZP-CSI-RS resource and an NZP-CSI-RS resource, and these CSI-RS resources have no association relationship with each other.

The reference signal resource group includes only zero power-reference signal resources, these zero power-reference signal resources have an association relationship between each other, and these zero power-reference signal resources correspond to at least one non zero power-reference signal resource.

The reference signal resource group includes only zero power-reference signal resources, these zero power-reference signal resources have no association relationship between each other, and these zero power-reference signal resources correspond to at least one non zero power-reference signal resource.

The reference signal resource group includes only non zero power-reference signal resources, and these non zero power-reference signal resources have an association relationship between each other.

Alternatively, the reference signal resource group includes only non zero power-reference signal resources, and these non zero power-reference signal resources have no association relationship between each other.

Optionally, the reference signal resource group information includes an index of a reference signal resource that belongs to the reference signal resource group.

In some possible designs, each piece of reference signal resource group information may include one of the following:

a resource index of at least one zero power-reference signal resource, where a zero power-reference signal resource corresponding to the resource index of the zero power-reference signal resource that is included in the at least one resource index corresponds to at least one non zero power-reference signal resource; or a resource index of at least one non zero power-reference signal resource; or a resource index of at least one zero power-reference signal resource that has no association relationship with a non zero power-reference signal resource.

In some possible designs, the reference signal resource group information includes at least one of the following:

a mapping relationship between information about at least one zero power-reference signal and information about at least one non zero power-reference signal; or information about at least one non zero power-reference signal; or information about at least one reference signal, and information about another reference signal that has an association relationship with the reference signal; or information about at least one reference signal, and information about another reference signal that has no association relationship with the at least one reference signal.

The reference signal is a zero power-reference signal or a non zero power-reference signal.

Optionally, the second device may further set at least one of a first upper limit and a second upper limit in the configuration information. The first upper limit refers to a maximum quantity of zero power-reference signal resources included in one reference signal resource group.

The second upper limit refers to a maximum quantity of non zero power-reference signal resources included in one reference signal resource group. An amount of information reported at a time may be limited by configuring an upper limit value of a resource quantity, thereby reducing resource overheads.

Optionally, the second device may further set a lower limit in the configuration information, the lower limit is a constraint condition for reporting the information about the association relationship, and the lower limit refers to a minimum quantity of zero power-reference signal resources associated with a beam group.

Figure 7:
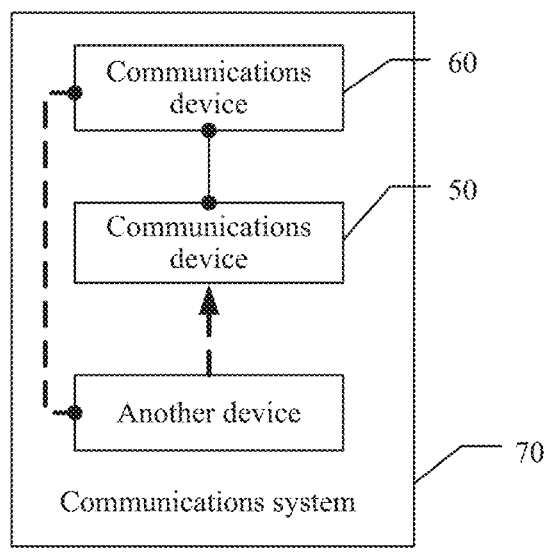
FIG. 7 is a schematic structural diagram of a communications system according to an embodiment of the present invention.

3. Referring to FIG. 7, a communications system 70 is described. The communications system 70 includes:

the communications device shown in FIG. 5 and the communications device shown in FIG. 6. The communications system 79 may further include another device. The communications system may perform the solution that is performed in the embodiment shown in any one of FIG. 3 to FIG. 6. For details, refer to the foregoing part. Details are not described herein again.

Figure 8:
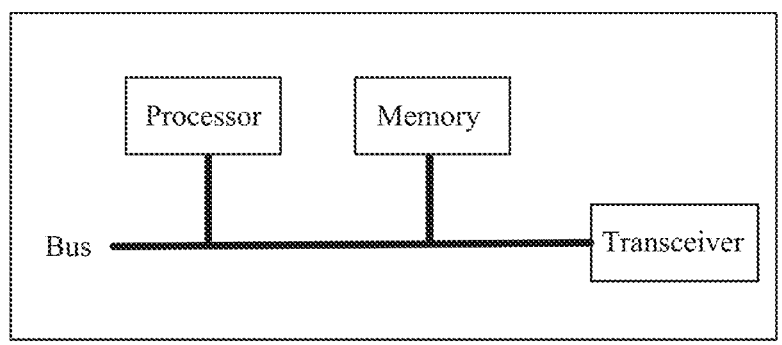
FIG. 8 is a schematic structural diagram of a device that performs a measurement reporting method according to an embodiment of the present invention.

It should be noted that, in the embodiments of this application (including the embodiments shown in FIG. 5, FIG. 6, and FIG. 7), each entity device corresponding to a transceiver module may be a transceiver, and each entity device corresponding to a processing module may be a processor. The apparatuses shown in FIG. 5, FIG. 6, and FIG. 7 may all have a structure shown in FIG. 8. When one apparatus has the structure shown in FIG. 8, a processor and a transceiver in FIG. 8 implement functions that are the same as or similar to those of the processing module and the transceiver module provided in the apparatus embodiment corresponding to the apparatus, and a memory in FIG. 8 stores program code that needs to be invoked when the processor performs the measurement reporting method.

The communications device 50, the communications device 60, and the communications system 70 in the embodiments of the present invention are separately described above from a perspective of modular functional entities. The communications device 50 and the communications device 60 in the embodiments of the present invention are separately described below from a perspective of hardware processing. It should be noted that, in the embodiment shown in FIG. 5 in the present invention, an entity device corresponding to the transceiver module may be an input/output unit, an entity device corresponding to the processing module may be a processor, and an entity device corresponding to a display module may be a display unit such as a display screen. The apparatus shown in FIG. 5 may have a structure shown in FIG. 9. When the apparatus shown in FIG. 5 has the structure shown in FIG. 9, a processor and a transceiver in FIG. 9 can implement functions that are the same as or similar to those of the processing module and the transceiver module provided in the apparatus embodiment corresponding to the apparatus, and a central memory in FIG. 9 stores program code that needs to be invoked when the processor performs the measurement reporting method. In the embodiment shown in FIG. 6 in the present invention, an entity device corresponding to the transceiver module may be an input/output interface, and an entity device corresponding to the processing module may be a processor. The apparatus shown in FIG. 6 may have a structure shown in FIG. 10. When the apparatus shown in FIG. 6 has the structure shown in FIG. 10, a processor and an RF circuit in FIG. 10 can implement functions that are the same as or similar to those of the processing module and the transceiver module provided in the apparatus embodiment corresponding to the apparatus, and a memory in FIG. 10 stores program code that needs to be invoked when the processor performs the measurement reporting method.

Figure 9:
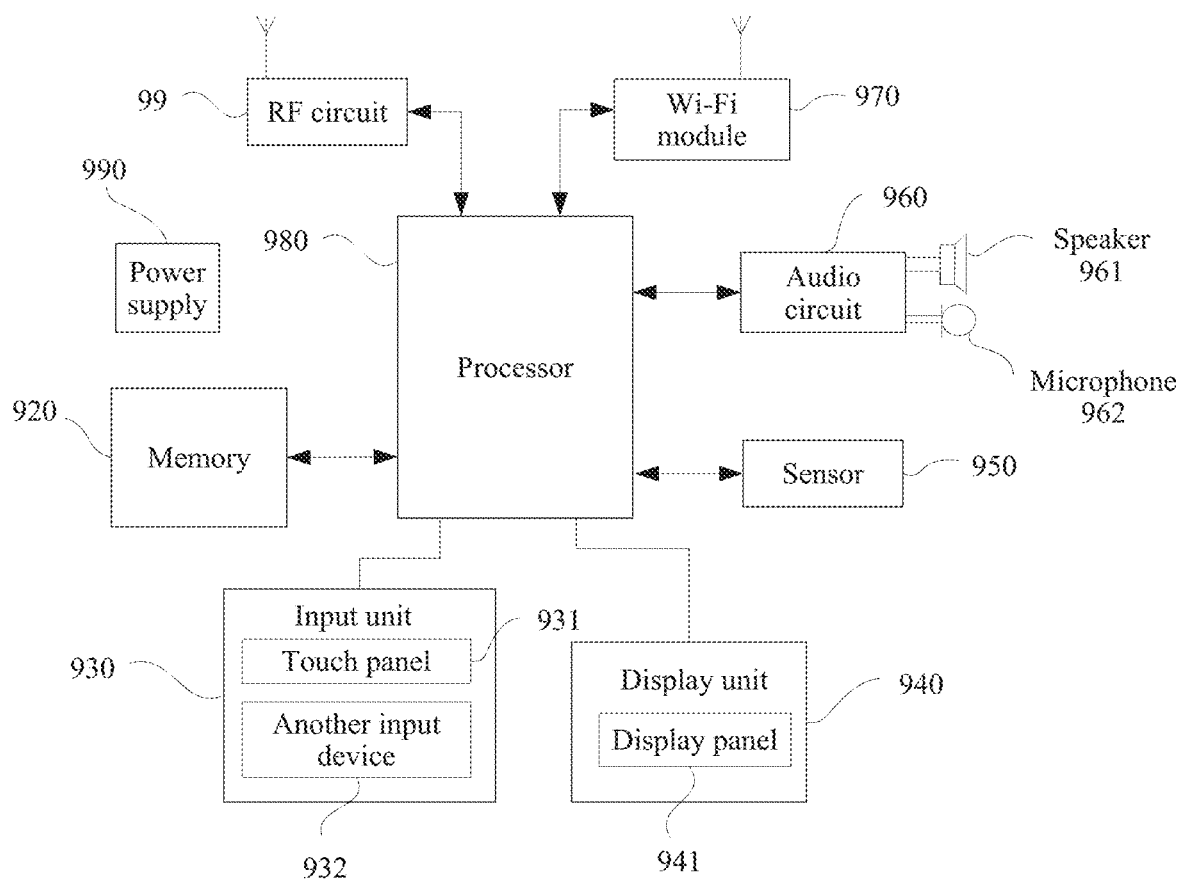
FIG. 9 is a schematic structural diagram of a mobile phone that performs a measurement reporting method according to an embodiment of the present invention.

For example, an embodiment of the present invention further provides another terminal device. As shown in FIG. 9, for ease of description, only parts related to this embodiment of the present invention are shown. For specific technical details that are not disclosed, refer to the method parts of the embodiments of the present invention. The terminal device may be any terminal device such as a mobile phone, a tablet computer, a personal digital assistant (English acronym: PDA), a sales terminal (English full name: Point of Sales, English acronym: POS), or an in-vehicle computer. That the terminal is a mobile phone is used as an example.

FIG. 9 is a block diagram of a partial structure of the mobile phone related to the terminal provided in this embodiment of the present invention. Referring to FIG. 9, the mobile phone includes components such as a radio frequency (English acronym: RF) circuit 99, a memory 920, an input unit 930, a display unit 940, a sensor 950, an audio circuit 960, a wireless fidelity (English acronym: Wi-Fi) module 970, a processor 980, and a power supply 990. A person skilled in the art may understand that a mobile phone structure shown in FIG. 9 does not constitute any limitation on the mobile phone, and the mobile phone may include more or fewer components than those shown in the figure, or some components are combined, or a different component deployment is used.

The components of the mobile phone are described in detail below with reference to FIG. 9.

The RF circuit 99 may be configured to receive and send signals in an information receiving and sending process or during a call. Particularly, after receiving downlink information from a base station, the RF circuit 99 sends the downlink information to the processor 980 for processing. In addition, the RF circuit 99 sends designed uplink data to the base station: Usually, the RF circuit 99 includes but is not limited to an antenna, at least one amplifier, a transceiver, a coupler, a low noise amplifier (English acronym: LNA), a duplexer, and the like. In addition, the RF circuit 99 may further communicate with a network and another device through wireless communication. The wireless communication may be based on any communication standard or protocol, including but not limited to a global system for mobile communications (English full name: Global System of Mobile communication, English acronym: GSM), a general packet radio service (English acronym: GPRS), code division multiple access (English acronym: CDMA), wideband code division multiple access (English acronym: WCDMA), long term evolution (English acronym: LTE), an email, or a short message service (English full name: Short Messaging Service, English acronym: SMS).

The memory 920 may be configured to store a software program and a module. The processor 980 runs the software program and the module that are stored in the memory 920, to perform various function applications and data processing of the mobile phone. The memory 920 may mainly include a program storage area and a data storage area. The program storage area may store an operating system, an application program required by at least one function (such as a sound playback function and an image display function), and the like. The data storage area may store data (such as audio data or an address book) created based on use of the mobile phone, and the like. In addition, the memory 920 may include a high speed random access memory, and may also include a non-volatile memory, such as at least one magnetic disk storage device, a flash storage device, or another volatile solid-state storage device.

The input unit 930 may be configured to receive input digit or character information, and generate a key signal input related to a user setting and function control of the mobile phone. Specifically, the input unit 930 may include a touch panel 931 and another input device 932. The touch panel 931, also referred to as a touchscreen, may collect a touch operation of the user on or near the touch panel 931 (such as an operation of the user on or near the touch panel 931 by using any suitable object or accessory such as a finger or a stylus), and drive a corresponding connection apparatus based on a preset program. Optionally, the touch panel 931 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and then sends the touch point coordinates to the processor 980. In addition, the touch controller can receive and execute a command sent by the processor 980. In addition, the touch panel 931 may be a resistive, capacitive, infrared, or surface sound wave type touch panel. In addition to the touch panel 931, the input unit 930 may further include another input device 932. Specifically, the another input device 932 may include, but is not limited to, one or more of a physical keyboard, a functional button (such as a sound volume control button or a power button), a trackball, a mouse, or a joystick.

The display unit 940 may be configured to display information entered by a user or information provided for a user and various menus of the mobile phone. The display unit 940 may include a display panel 941. Optionally, the display panel 941 may be configured in a form of a liquid crystal display (English acronym: LCD), an organic light-emitting diode (English acronym: OLED), or the like. Further, the touch panel 931 may cover the display panel 941. After detecting a touch operation on or near the touch panel 931, the touch panel 931 transfers the touch operation to the processor 980, to determine a type of a touch event. Subsequently, the processor 980 provides a corresponding visual output on the display panel 941 based on the type of the touch event. Although in FIG. 9, the touch panel 931 and the display panel 941 are used as two separate components to implement input and input functions of the mobile phone, in some embodiments, the touch panel 931 and the display panel 941 may be integrated to implement the input and Output functions of the mobile phone.

The mobile phone may further include at least one sensor 950, such as an optical sensor, a motion sensor, and another sensor. Specifically, the optical sensor may include an ambient light sensor and a proximity sensor. The ambient light sensor may adjust brightness of the display panel 941 based on brightness of an ambient light. The proximity sensor may disable the display panel 941 and/or backlight when the mobile phone is moved to an ear. As one type of motion sensor, an accelerometer sensor may detect magnitude of accelerations in all directions (usually on three axes), may detect magnitude and a direction of the gravity when the mobile phone is still, and may be applied to an application that recognizes an attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor that may be further configured in the mobile phone are not described herein.

The audio circuit 960, a speaker 961, and a microphone 962 can provide audio interfaces between the user and the mobile phone. The audio circuit 960 may convert received audio data into an electrical signal and transmit the electrical signal to the speaker 961; and the speaker 961 converts the electrical signal into a sound signal for output. On the other hand, the microphone 962 converts a collected sound signal into an electrical signal; the audio circuit 960 receives the electrical signal, converts the electrical signal into audio data, and then outputs the audio data to the processor 980; and the processor 980 processes the audio data and then sends the processed audio data to, for example, another mobile phone through the RF circuit 99, or outputs the processed audio data to the memory 920 for further processing.

Wi-Fi is a short distance wireless transmission technology. The mobile phone may help, by using the Wi-Fi module 970, a user receive and send an email, browse a web page, and access stream media, and the like. This provides wireless broadband internet access for the user. Although FIG. 9 shows the module 970, it may be understood that the Wi-Fi module 970 is not a necessary component of the mobile phone, and when required, the Wi-Fi module 970 may be omitted provided that the scope of the essence of the present invention is not changed.

The processor 980 is a control center of the mobile phone, and connects all parts of the entire mobile phone by using various interfaces and lines. By running or executing the software program and/or the module stored in the memory 920 and invoking the data stored in the memory 920, the processor 980 performs various functions and/or data processing of the mobile phone, to perform overall monitoring on the mobile phone. Optionally, the processor 980 may include one or more processing units. Preferably, the processor 980 may integrate an application processor and a modem processor. The application processor mainly processes the operating system, a user interface, the application program, and the like. The modem processor mainly processes wireless communication. It may be understood that the modern processor may alternatively not be integrated in the processor 980.

The mobile phone further includes a power supply 990 (such as a battery) for supplying power to each component. Preferably, the power supply may be logically connected to the processor 980 by using a power management system, thereby implementing functions such as charging, discharging, and power consumption management by using the power management system.

Although not shown, the mobile phone may further include a camera, a Bluetooth module, and the like. Details are not described herein.

In this embodiment of the present invention, the processor 980 included in the mobile phone further has a function of controlling performing of the method procedure performed by the first device.

Figure 10:
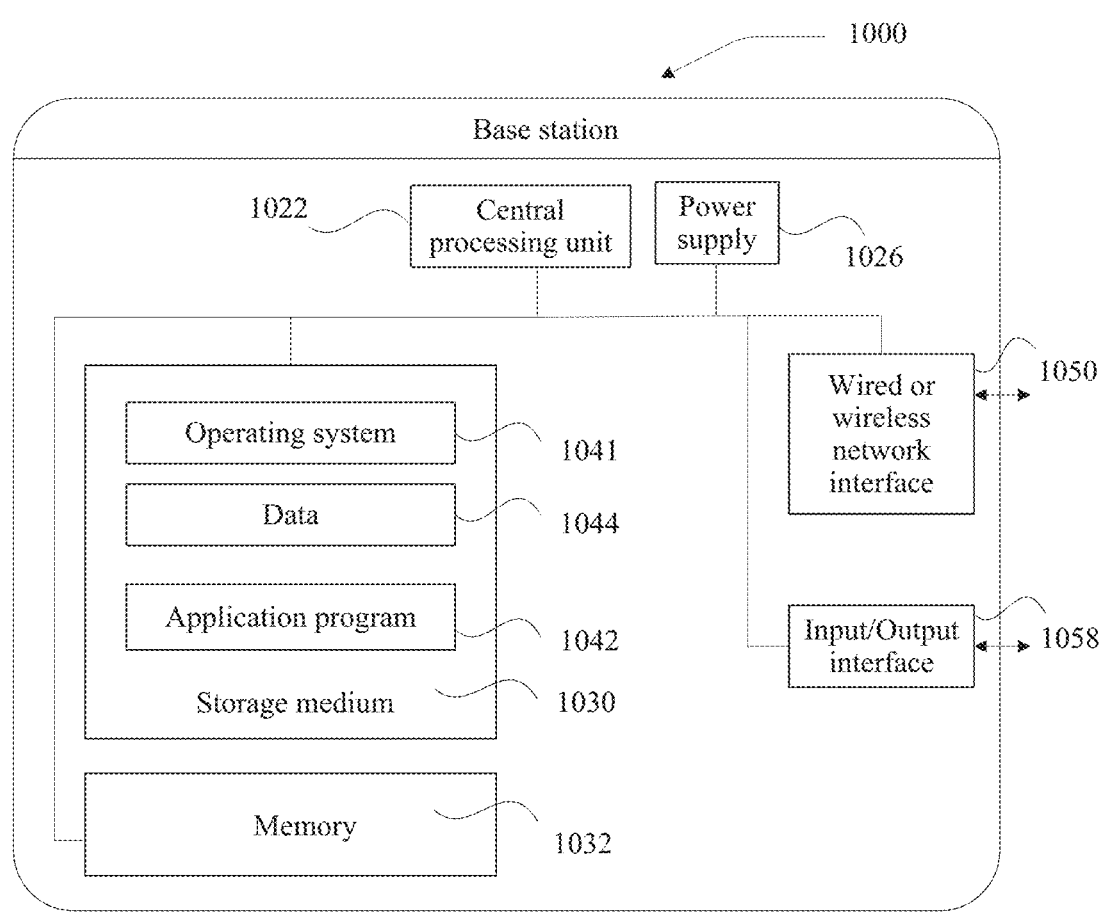
FIG. 10 is a schematic structural diagram of a base station that performs a measurement reporting method according to an embodiment of the present invention.

For another example, FIG. 10 is a schematic structural diagram of a base station according to an embodiment of the present invention. The base station 1020 may vary greatly depending on different configurations or performance, and may include one or more processors (English full name: central processing units, English acronym: CPU) 1022 (for example, one or more processors), a memory 1032, and one or more storage media 1030 (for example, one or more mass storage devices) storing an application program 1042 or data 1044. The memory 1032 and the storage medium 1030 may be a transient storage or a persistent storage. A program stored in the storage medium 1030 may include one or more modules (not shown), and each module may include a series of instructions and operations for the base station. Still further, the central processing unit 1022 may be configured to communicate with the storage medium 1030, and execute a series of instructions and operations in the storage medium 1030 on the server 1020.

The base station 1020 may further include one or more power supplies 1026, one or more wired or wireless network interfaces 1050, one or more input/output interfaces 1058, and/or one or more operating systems 1041, for example, Windows Server™, Mac OS X™, Unix™, Linux™, or FreeBSD™.

The steps performed by the first device or the second device in the foregoing embodiments may be based on a structure of the base station shown in FIG. 10.

In the foregoing embodiments, the descriptions of the embodiments have respective focuses. For a part that is not described in detail in an embodiment, refer to a related description in another embodiment.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electrical, mechanical, or other forms.

The modules described as separate parts may or may not be physically separate, and parts displayed as modules may or may not be physical modules, may be located in one position, or may be distributed on a plurality of network modules. Some or all the modules may be selected based on actual needs to achieve the objectives of the solutions of the embodiments.

In addition, functional modules in the embodiments of this application may be integrated into one processing module, or each of the modules may exist alone physically, or two or more modules are integrated into one module. The integrated module may be implemented in a form of hardware, or may be implemented in a form of a software functional module. When the integrated module is implemented in the form of a software functional module and sold or used as an independent product, the integrated module may be stored in a computer-readable storage medium.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The technical solutions provided in this application are described in detail above. The principle and implementations of this application are described in this application by using specific examples. The description about the embodiments is merely provided to help understand the method and core ideas of this application. In addition, a person of ordinary skill in the art can make variations in terms of the specific implementations and application scopes based on the ideas of this application. In conclusion, content of this specification shall not be construed as a limitation on this application.

What is claimed is:

1. A communication apparatus, comprising:
    at least one processor; and
    a non-transitory computer-readable storage medium coupled to the at least one processor and storing programming instructions for execution by the at least one processor, wherein the programming instructions instruct the at least one processor to:
        receive configuration information from a second device, wherein the configuration information is used by a first device to report information about an association relationship between a zero power-reference signal resource and a non-zero power-reference signal resource, wherein the association relationship indicates that (i) a zero power-reference signal measurement value associated with the zero power-reference signal resource is greater than a first measurement threshold, and a non-zero power-reference signal measurement value associated with the non-zero power-reference signal resource is greater than a second measurement threshold, and (ii) a spatial quasi co-location (QCL) relationship exists between the zero power-reference signal resource and the non-zero power-reference signal resource, and wherein the spatial QCL relationship indicates that a difference between a first QCL parameter of a first antenna port associated with the zero power-reference signal resource and a second QCL parameter of a second antenna port associated with the non-zero power-reference signal resource is less than a threshold;
        add the zero power-reference signal resource and the non-zero power-reference signal resource to a reference signal resource group, wherein an association relationship exists between every two reference signal resources in the reference signal resource group; and
        report the information about the association relationship based on the configuration information, wherein the information about the association relationship comprises reference signal resource group information of the reference signal resource group.

2. The apparatus according to claim 1, wherein the configuration information comprises at least one measurement threshold, and wherein the at least one measurement threshold is used to determine the association relationship between the zero power-reference signal resource and the non-zero power-reference signal resource.

3. The apparatus according to claim 2, wherein the association relationship satisfies at least one of the following conditions:
    both a zero power-reference signal measurement value and a non-zero power-reference signal measurement value are greater than the first measurement threshold; or
    a zero power-reference signal and a non-zero power-reference signal are received by the first device by using a same antenna array or a same antenna panel, wherein
    the zero power-reference signal is a signal mapped to the zero power-reference signal resource, and wherein the non-zero power-reference signal is a signal mapped to the non-zero power-reference signal resource.

4. The apparatus according to claim 3, wherein the reference signal resource group information is associated with a plurality of reference signal resource groups, and wherein each reference signal resource group comprises at least one zero power-reference signal resource.

5. The apparatus according to claim 4, wherein for a reference signal resource in each reference signal resource group, one of the following conditions is comprised:
    the zero power-reference signal resource belongs to a reference signal resource group corresponding to the non-zero power-reference signal resource that has the association relationship with the zero power-reference signal resource; or the zero power-reference signal resource does not belong to a reference signal resource group corresponding to the non-zero power-reference signal resource that has the association relationship with the zero power-reference signal resource.

6. The apparatus according to claim 4, wherein the reference signal resource group information comprises an index of a reference signal resource that belongs to the reference signal resource group.

7. A communication apparatus, comprising:
at least one processor; and
a non-transitory computer-readable storage medium coupled to the at least one processor and storing programming instructions for execution by the at least one processor, wherein the programming instructions instruct the at least one processor to:
generate configuration information, and send the configuration information to a first device, wherein
the configuration information is used by the first device to report information about an association relationship between a zero power-reference signal resource and a non-zero power-reference signal resource, wherein the association relationship indicates that (i) a zero power-reference signal measurement value associated with the zero power-reference signal resource is greater than a first measurement threshold, and a non-zero power-reference signal measurement value associated with the non-zero power-reference signal resource is greater than a second measurement threshold, and (ii) a spatial quasi co-location (QCL) relationship exists between the zero power-reference signal resource and the non-zero power-reference signal resource, and wherein the spatial QCL relationship indicates that a difference between a first QCL parameter of a first antenna port associated with the zero power-reference signal resource and a second QCL parameter of a second antenna port associated with the non-zero power-reference signal resource is less than a threshold; and
receive the information about the association relationship reported by the first device based on the configuration information, wherein the information about the association relationship comprises reference signal resource group information of a reference signal resource group, wherein the reference signal resource group comprises the zero power-reference signal resource and the non-zero power-reference signal resource, and wherein an association relationship exists between every two reference signal resources in the reference signal resource group.

8. The apparatus according to claim 7, wherein the configuration information comprises at least one measurement threshold, and wherein the at least one measurement threshold is used to determine the association relationship between the zero power-reference signal resource and the non-zero power-reference signal resource.

9. The apparatus according to claim 7, wherein the configuration information comprises at least one of the following reporting conditions:
a measurement value of a signal mapped to reference signal resources that have an association relationship is greater than a measurement threshold;
a measurement value of a signal mapped to reference signal resources that have no association relationship is less than the measurement threshold;

the QCL relationship exists between the zero power-reference signal resource and the non-zero power-reference signal resource;
both a zero power-reference signal and a non-zero power-reference signal are received by the first device; or
a zero power-reference signal and a non-zero power-reference signal are received by the first device by using a same antenna array or a same antenna panel, wherein the non-zero power-reference signal corresponds the non-zero power-reference signal resource, and wherein the zero power-reference signal corresponds the zero power-reference signal resource.

10. The apparatus according to claim 8, wherein the association relationship satisfies at least one of the following conditions:
both a zero power-reference signal measurement value and a non-zero power-reference signal measurement value are greater than the first measurement threshold;
both a zero power-reference signal and a non-zero power-reference signal are received by the first device; or
a zero power-reference signal and a non-zero power-reference signal are received by the first device by using a same antenna array or a same antenna panel, wherein
the zero power-reference signal is a signal mapped to the zero power-reference signal resource, and wherein the non-zero power-reference signal is a signal mapped to the non-zero power-reference signal resource.

11. The apparatus according to claim 10, wherein the reference signal resource group information is associated with a plurality of reference signal resource groups, and wherein each reference signal resource group comprises at least one zero power-reference signal resource.

12. The apparatus according to claim 11, wherein for a reference signal resource in each reference signal resource group, one of the following conditions is comprised:
the zero power-reference signal resource belongs to a reference signal resource group corresponding to the non-zero power-reference signal resource that has the association relationship with the zero power-reference signal resource; or
the zero power-reference signal resource does not belong to a reference signal resource group corresponding to the non-zero power-reference signal resource that has the association relationship with the zero power-reference signal resource.

13. The apparatus according to claim 11, wherein the reference signal resource group information comprises an index of a reference signal resource that belongs to the reference signal resource group.

14. A measurement reporting method, wherein the method comprises:
receiving, by a first device, configuration information from a second device, wherein the configuration information is used by the first device to report information about an association relationship between a zero power-reference signal resource and a non-zero power-reference signal resource, wherein the association relationship indicates that (i) both a zero power-reference signal measurement value associated with the zero power-reference signal resource and a non-zero power-reference signal measurement value associated with the non-zero power-reference signal resource are greater than a first measurement threshold, and (ii) a spatial quasi co-location (QCL) relationship exists between the zero power-reference signal resource and the non-zero power-reference signal resource, and wherein the spatial QCL relationship indicates that a difference between a first QCL parameter of a first antenna port associated with the zero power-reference signal resource and a second QCL parameter of a second antenna port associated with the non-zero power-reference signal resource is less than a threshold;

adding the zero power-reference signal resource and the non-zero power-reference signal resource to a reference signal resource group, wherein an association relationship exists between every two reference signal resources in the reference signal resource group; and reporting, by the first device, the information about the association relationship based on the configuration information, wherein the information about the association relationship comprises reference signal resource group information of the reference signal resource group.

15. The method according to claim 14, wherein the configuration information comprises at least one measurement threshold, and wherein the at least one measurement threshold is used to determine the association relationship between the zero power-reference signal resource and the non-zero power-reference signal resource.

16. The method according to claim 15, wherein the association relationship satisfies at least one of the following conditions:

a zero power-reference signal measurement value is greater than the first measurement threshold, and a non-zero power-reference signal measurement value is greater than a second measurement threshold;

both a zero power-reference signal and a non-zero power-reference signal are received by the first device; or a zero power-reference signal and a non-zero power-reference signal are received by the first device by using a same antenna array or a same antenna panel, wherein the zero power-reference signal is a signal mapped to the zero power-reference signal resource, and wherein the non-zero power-reference signal is a signal mapped to the non-zero power-reference signal resource.

17. The method according to claim 16, wherein the reference signal resource group information is associated with a plurality of reference signal resource groups, and wherein each reference signal resource group comprises at least one zero power-reference signal resource.

18. The method according to claim 17, wherein for a reference signal resource in each reference signal resource group, one of the following conditions is comprised:

the zero power-reference signal resource belongs to a reference signal resource group corresponding to the non-zero power-reference signal resource that has the association relationship with the zero power-reference signal resource; or the zero power-reference signal resource does not belong to a reference signal resource group corresponding to the non-zero power-reference signal resource that has the association relationship with the zero power-reference signal resource.

19. The method according to claim 17, wherein the reference signal resource group information comprises an index of a reference signal resource that belongs to the reference signal resource group.

20. The apparatus according to claim 1, wherein the spatial QCL relationship indicates at least one of:

that the first QCL parameter of a first antenna port and the second QCL parameter of the second antenna port are the same; or that the first QCL parameter of the first antenna port is determinable based on the second QCL parameter of the second antenna port that has the spatial QCL relationship with the first antenna port.

21. The apparatus according to claim 1, wherein the configuration information comprises the first measurement threshold and the second measurement threshold.

\* \* \* \* \*